United States Patent
Spackman et al.

(10) Patent No.: US 10,915,821 B2
(45) Date of Patent: Feb. 9, 2021

(54) INTERACTION CONTENT SYSTEM AND METHOD UTILIZING KNOWLEDGE LANDSCAPE MAP

(71) Applicant: Cognitive Performance Labs Limited, Auckland (NZ)

(72) Inventors: Kerry Spackman, Auckland (NZ); Grant Davidson, Auckland (NZ); Jóvan Sean Dippenaar, Auckland (NZ); Rachel Meadows, Auckland (NZ)

(73) Assignee: Cognitive Performance Labs Limited, Auckland (NZ)

(*) Notice: Subject to any disclaimer, the term of this patent is extended or adjusted under 35 U.S.C. 154(b) by 0 days.

(21) Appl. No.: 16/584,441

(22) Filed: Sep. 26, 2019

(65) Prior Publication Data
US 2020/0293913 A1    Sep. 17, 2020

Related U.S. Application Data

(60) Provisional application No. 62/816,832, filed on Mar. 11, 2019.

(51) Int. Cl.
| | | |
|---|---|---|
| *G06N 5/02* | (2006.01) | |
| *G06F 16/908* | (2019.01) | |
| *G09B 7/00* | (2006.01) | |
| *G09B 5/06* | (2006.01) | |

(52) U.S. Cl.
CPC ............ *G06N 5/022* (2013.01); *G06F 16/908* (2019.01); *G09B 5/065* (2013.01); *G09B 7/00* (2013.01)

(58) Field of Classification Search
None
See application file for complete search history.

(56) References Cited

U.S. PATENT DOCUMENTS

| | | | |
|---|---|---|---|
| 5,506,937 A * | 4/1996 | Ford | G09B 23/28 |
| | | | 706/11 |
| 6,421,066 B1 | 7/2002 | Sivan | |
| 6,551,109 B1 | 4/2003 | Rudmik | |
| 7,152,070 B1 * | 12/2006 | Musick | G06F 8/30 |
| 8,407,165 B2 * | 3/2013 | Monroe | G06F 16/345 |
| | | | 706/12 |
| 8,761,658 B2 | 6/2014 | Kim et al. | |
| 9,576,495 B2 | 2/2017 | Carney et al. | |
| 2003/0152902 A1 | 8/2003 | Altenhofen et al. | |
| 2004/0202987 A1 | 10/2004 | Scheuring et al. | |

(Continued)

OTHER PUBLICATIONS

Crampes, Michel, et al. "Concept maps for designing adaptive knowledge maps." Information Visualization 5.3 (2006): 211-224. (Year: 2006).*

(Continued)

*Primary Examiner* — Daniel T Pellett
(74) *Attorney, Agent, or Firm* — Knobbe Martens Olson & Bear, LLP

(57) ABSTRACT

An information delivery system allows for the organization and presentation of information to users. Illustratively, aspects of the disclosure correspond to a system and method which provides for interactive information delivery, or interactive learning. More particularly, a platform is disclosed which provides an independent interactive interface for content delivery and e-learning and for creation of teaching or learning presentations.

20 Claims, 20 Drawing Sheets

(56) References Cited

U.S. PATENT DOCUMENTS

| | | | |
|---|---|---|---|
| 2006/0008789 A1* | 1/2006 | Gerteis | G09B 5/00 |
| | | | 434/365 |
| 2006/0253495 A1* | 11/2006 | Png | G06F 16/283 |
| 2007/0111181 A1 | 5/2007 | Hochwarth et al. | |
| 2013/0283138 A1 | 10/2013 | Tao et al. | |
| 2015/0006295 A1* | 1/2015 | Liu | G06Q 50/01 |
| | | | 705/14.66 |
| 2015/0186951 A1* | 7/2015 | Wilson | G06N 3/063 |
| | | | 705/14.66 |
| 2015/0379113 A1* | 12/2015 | Wang | H04L 67/02 |
| | | | 707/738 |
| 2017/0243502 A1* | 8/2017 | Loh | G09B 7/04 |
| 2017/0249399 A1* | 8/2017 | Hu | G06F 16/00 |
| 2018/0254064 A1* | 9/2018 | Gonzalez-Banos | |
| | | | G06F 16/785 |
| 2018/0255329 A1* | 9/2018 | Gonzalez-Banos | G06F 16/70 |

OTHER PUBLICATIONS

Chambel, Teresa, and Nuno Guimarães. "Context perception in video-based hypermedia spaces." Proceedings of the thirteenth ACM conference on Hypertext and hypermedia. 2002. (Year: 2002).*
Badii, Atta, et al. "Semi-automatic knowledge extraction, representation and context-sensitive intelligent retrieval of video content using collateral context modelling with scalable ontological networks." Signal Processing: Image Communication 24.9 (2009): 759-773. (Year: 2009).*
International Search Report and Written Opinion in corresponding International Application No. PCT/US2020/021746 dated May 14, 2020 in 14 pages.

* cited by examiner

INTERACTION CONTENT SYSTEM AND METHOD UTILIZING KNOWLEDGE LANDSCAPE MAP

BACKGROUND

Field of the Invention

The present application relates to information delivery systems for the organization and presentation of information to users. Illustratively, aspects of the present application correspond to a system and method which provides for interactive information delivery, or interactive learning. More particularly, a platform is disclosed which provides an independent interactive interface for content delivery and e-learning and for creation of teaching or learning presentations.

Description of the Related Art

Many content delivery and interactive learning systems are linear in terms of how content is distributed for presentation. More specifically, face-to-face talks, presentations or lectures typically proceed from a beginning to the end in a linear fashion. Accordingly, online resources, for example audio and video recordings, are also designed for linear consumption.

Such existing linear approaches are not well suited to organize and present information according to a multidimensional or non-linear manner. For example, linear approaches are limited in presenting content, such as sequential video frames that can be advanced or reversed only in the order in which they are arranged by the content provider. Such linear systems are poorly suited for different presentation flow or modification of presentation or are very inefficient in allow "jumping" along the established sequential presentation. Still further, existing systems do not have the ability to provide for "network effects," where integrating information from different disciplines and areas of knowledge can lead to innovation. Moreover, existing tools suffer functionality issues. They make it difficult to search for and find specific subareas of information, and difficult to annotate or complete exercises while learning. This results in inefficiencies, which include inefficient use of computational resource. More bandwidth is required to download unnecessary data, and more processor time is required to locate required information in the retrieved data.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

The present application is directed to addressing one or more of the deficiencies set forth above by providing an improved content delivery system which may be implemented as a data processing system 600 (FIG. 6) and method. Illustratively, the data processing system 600 (FIG. 6) graphically presents information as a knowledge landscape map which includes graphically presented interconnected knowledge topics represented as nodes on a graphical display. Individual topics can be related or have dependency relationships together based on functional attributes and relationships. Relationships and dependencies can be illustratively represented graphically as connections between the topic nodes. Collections of nodes and connections can be further grouped together that facilitates understanding of the related learning topics.

Illustratively, embodiments of present application may include a data processing system 600 (FIG. 6) in which knowledge or learning topic data is organized into nodes and connectors of a knowledge landscape map. Illustratively, the media includes, but is not limited to, a plurality of frames/frame sequences made up of video, audio, audio-visual, augmented or virtual reality information. In one embodiment, individual learning topics can be organized as a set of nodes in which individual nodes represent concepts that develop identified concepts utilized to develop an understanding of the individual learning topic. In turn, the relationships between the individual nodes are represented in connectors in which the relationship or dependencies can be specified in attributes of the connectors. Groupings of nodes and connectors can be further organized to separate out related, but distinct sub-topics. Different presentations of the knowledge map landscapes can be utilized to convey the information, such as allowing individual exploration of the full map, providing access to integrated or linked media, the iterative development/build-up of the nodes/connectors, and the like.

As such, embodiments of the present application are directed to providing a novel and improved graphical display that is configured to deliver an augmented visual representation of the media data and the knowledge landscape map data (for example, comprising a library of attributes configured to describe said one or more learning or knowledge topics defined in a knowledge landscape map). The learning platform includes a control module embodied in program code which is configured to update or manipulate the displayed media data and the knowledge landscape map data so that the same learning or knowledge topic is identified, played or otherwise presented to the user. Consequently, one or more of the embodiments of the present application provide an enhanced learning experience and addressing some of the drawbacks found in previously developed learning platforms.

As used herein the term "and/or" means "and" or "or," or both. As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner. It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7). The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification. Other aspects of the invention may become apparent from the following description which is given by way of example only and with reference to the accompanying drawings.

DETAILED DESCRIPTION

Figure 1:
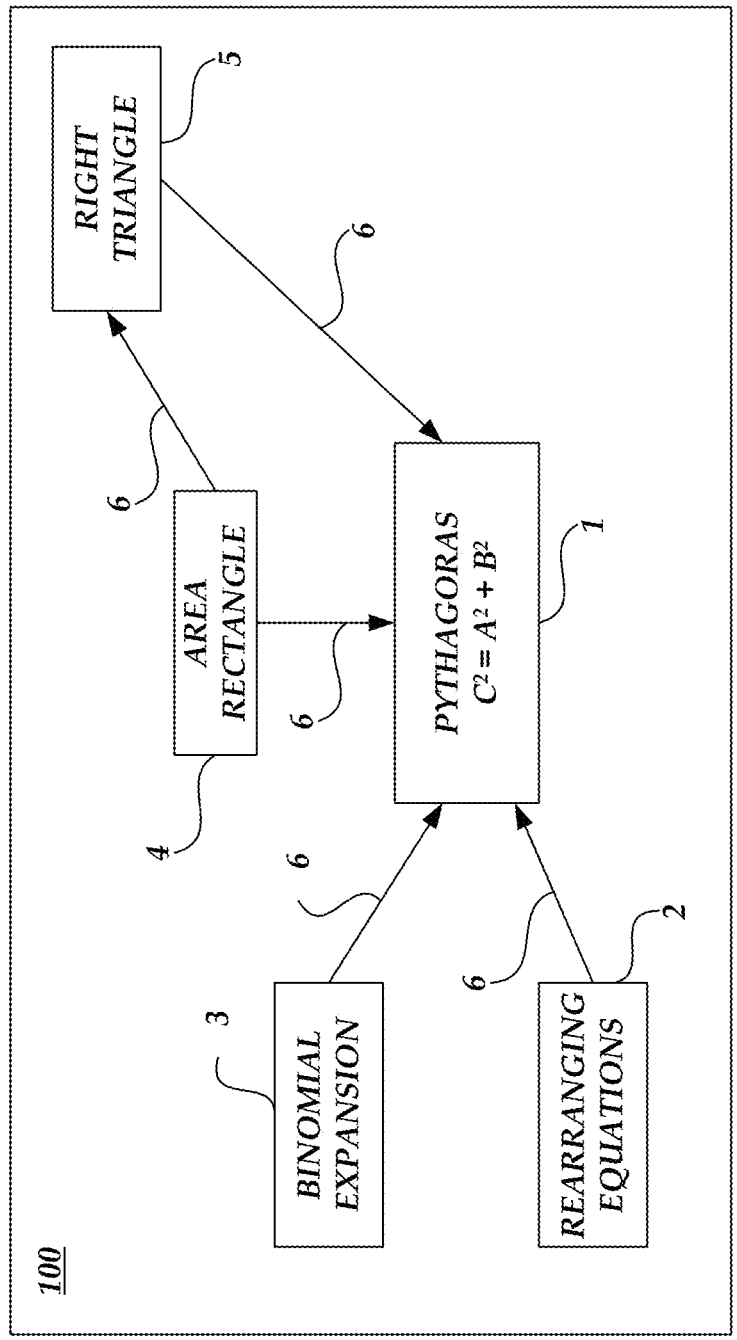
FIG. 1 is a block diagram depicting an illustrative knowledge landscape map in accordance with an aspect of the present application.

Generally described, aspects of the present application correspond to information delivery and information management systems and interfaces. More specifically, one or more aspects of the present application correspond to an interactive system in which information can be organized into a set of concepts embodied as individual nodes. Individual nodes can include information that can be presented to users, including various media, such as textual information, videos, interactive interfaces, links to additional resources, and the like. Nodes can be associated with meta-data or other information that identifies information such as the type of node, keywords or formulas. The nodes can also be associated with links or other relevant information for linked information.

Additionally, relationships or dependencies between concepts can be represented as connectors between the nodes. The dependencies can correspond to attributes of relationship or dependencies.

In accordance with some embodiments, related concepts (e.g., nodes) can be further grouped into sub-topics or related topics, generally referred to as sub-topics) that are displayed in a graphical interface. The groupings of sub-topics do not require each individual concept or node to have an established relationship, such as a one-to-one relationship between nodes in each sub-topic.

One or more aspects of the present application further include graphical interface and interactions with the graphical interface related to the graphically represented interactive structured diagram which is referred to in this document as a knowledge landscape map, as described further below. For example, the graphical interface can provide access to different types of media for teaching concepts. In another example, the graphical interface can selectively present the nodes of the knowledge map to reinforce individual concepts and dependency relationships. Still further, the graphical interface can generate supplemental interactions/information, such as linked content, historical tracking information, and the like.

Embodiments disclosed in this application relate to both video and audio-based educational content (including any augmented reality, virtual reality-based videos and other forms of machine readable data systems). To simplify this description, only video is often specifically referred to in this document, but this disclosure is equally applicable to information in formats that are solely audibly perceived by a user. Thus the use of the term video includes media that is perceived by a user visually, audibly and audio-visually.

One approach for playing video and audio recordings relates to linear presentation of content. Some disadvantages often faced by users when commencing learning based on the audio/video based content include that the audio/video contains a lot of 'filler material' which is not of real interest to the student. The student is forced to sit through a lot of irrelevant content before finding the specific information they were after. In other aspects, the audio/video based content is often poorly edited—e.g., the sequence may be confusing, or the instructor may skip key points which they assumed the student was familiar with etc. Still further, in other aspects, the audio/video might contain instruction which attempts to cater for students or users at many different knowledge levels, whereas the student may identify and only be interested in a single level, e.g., they may have an advanced level of knowledge and not be interested in having to sit through the entire video.

Furthermore, these media-based learning schemes are linear—in that they play from the start to the end; and thus do not allow individual users to efficiently deviate from an established order of presentation. If users need additional concepts or explanation, they cannot access this without manually interrupting the presentation and initiating a separate search for the further necessary information. Similarly, if they are not in need of specific content (e.g., filler or known material), they cannot easily access other content without manual interruption of the presentation followed by a manual search process to locate the information content they require. This problem results in unnecessary use on bandwidth, memory and processor resource. Even though the student can fast forward, rewind and pause a video, these actions do not simultaneously solve the problems above nor are they an efficient method of learning. Additionally, linear presentation models, such as video, do not have the advantages of association with a structured knowledge landscape such as a knowledge landscape map or diagram as outlined in the previous sections.

Consequently, in one example, aspects of the present application address the deficiencies, at least in part, and provide users with an ability to construct customized knowledge landscape map in a digital environment. Thus, in one example, the present application provides a graphical output that can be in the form of a graphical workspace that may be used by a user, such as a student, to build or construct a knowledge landscape map and also to view or listen to media files or portions of media files. As will be explained below, in some examples or embodiments the present application allows a user to view a video and in so doing reveal or highlight or otherwise identify the related topics or connections in the one or more nodes of a knowledge landscape map, so that the subject matter being described in the video is shown in context within the knowledge landscape map. Thus, the characterized knowledge topic being presented in the media file at any selected time is in synchrony with the indicated attribute (for example topic or connector) in the knowledge landscape map.

Alternatively or additionally, in other examples or embodiments the user can select an attribute such as a topic or connector, or a series or attributes, of the knowledge landscape map, or initiate a predetermined path or series of paths through the knowledge landscape map to selectively reveal or highlight various topics of a learning module. In these embodiments the platform navigates to the relevant part of the video, or selects a video from a plurality of available videos, so that again, the topic presented to the user from the media file is in synchrony with the relevant topic or connector revealed or highlighted in the knowledge landscape map.

Figure 5:
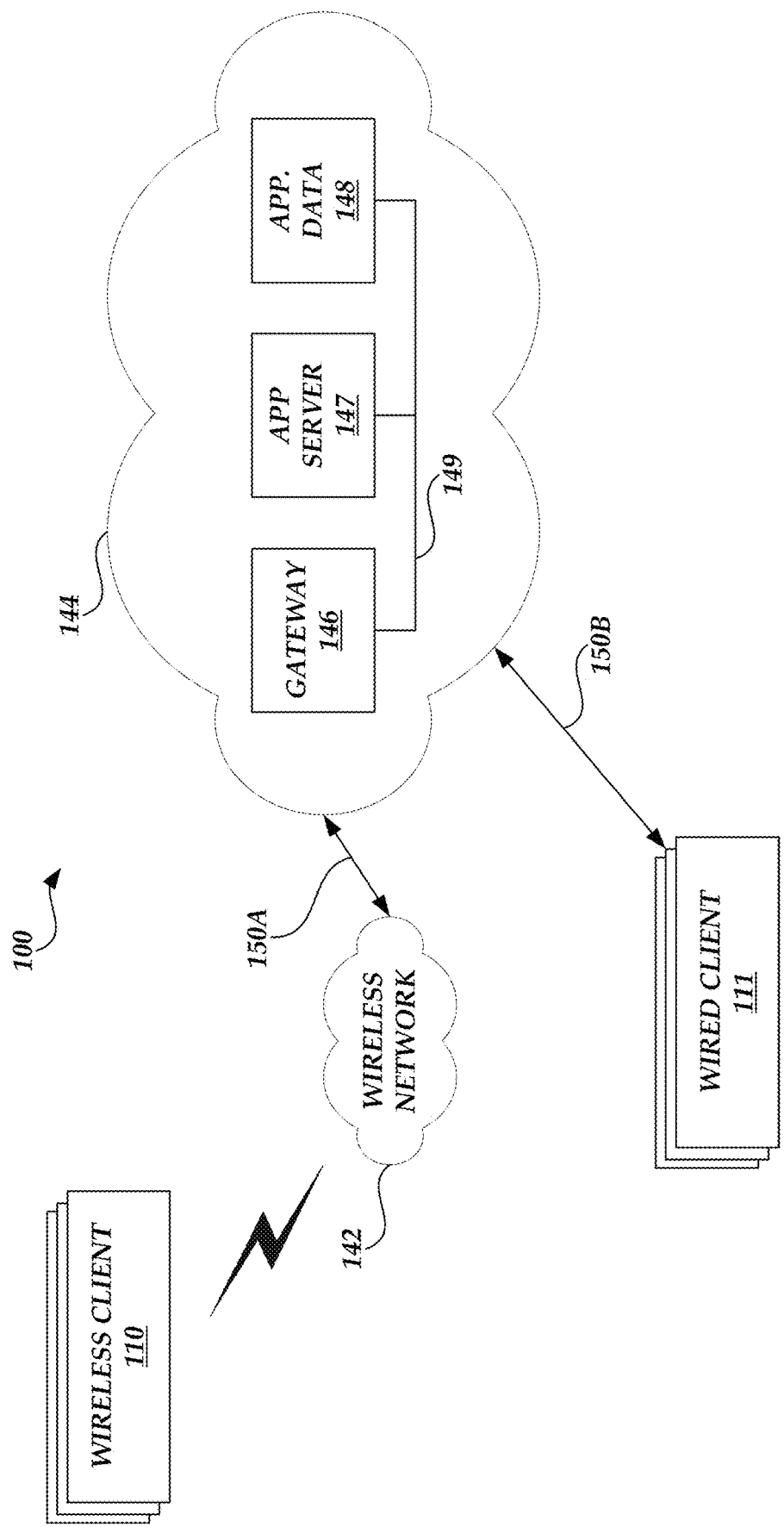
FIG. 5 is a block diagram an illustrative network between client devices and application data in accordance with an illustrative embodiment of the present application.

As indicated above, one or more aspects of the present application are intended for use in a data processing environment. Referring to FIG. 5, a data processing network environment in which one or more embodiments of the present application may be used is depicted. The data processing network 100 may include a plurality of individual networks, such as wireless network 142 and wired network 144. A plurality of wireless devices 110 may communicate over wireless network 142, and a plurality of wired devices, shown in the figure (by way of illustration) as clients 111, may communicate over network 144. Additionally, as those skilled in the art will appreciate, one or more local area networks ("LANs) may be included (not shown), where a LAN may comprise a plurality of devices coupled to a host processor. Each of the client's 111 or 110 can include cache or other memory that allows for local caching of content for display without requiring a continuous network connection.

Referring to FIG. 5, the networks 142 and 144 may also include mainframe computers or servers, such as a gateway computer 146 or application server 147 (which may access a data repository 148). A gateway computer 146 serves as a point of entry into each network, such as network 144. The gateway 146 may be preferably coupled to another network 142 by means of a communications link 150a. The gateway 146 may also be directly coupled to one or more client devices 111 using a communications link 150b, 150c, or may be indirectly coupled to such devices. The gateway computer 146 may also be coupled 149 to a storage device (such as data repository 148).

Those skilled in the art will appreciate that the gateway computer 146 may be physically located away from the network 142, and similarly, the workstations 111 may be located physically distant from the networks 142 and 144, respectively. The workstations 111 may connect to the wireless network 142 using a networking protocol such as the Transmission Control Protocol/Internet Protocol ("TCP/IP") over a number of alternative connection media, such as cellular phone, radio frequency networks, satellite networks, etc. The wireless network 142 preferably connects to the gateway 146 using a network connection 150a such as TCP or User Datagram Protocol ("UDP") over IP, X.25, Frame Relay, Integrated Services Digital Network ("ISDN), Public Switched Telephone Network ("PSTN), etc. The workstations 111 may connect directly to the gateway 146 using connections 150b or 150c. Further, the wireless network 142 and network 144 may connect to one or more other networks (not shown), in an analogous manner to that depicted in FIG. 5.

It will be appreciated that data and instructions required to instantiate aspects of the invention may be hosted remotely via the gateway 146 and/or, or may be stored on the device, such as a device 111, used by the student or teacher. As will be described below, the invention employs a graphical workspace presented on a visual display apparatus of device 111, such as a screen of a workstation, laptop, tablet or cell phone, and as such the user may access the platform using a variety of different devices including without limitation cell phones, tablets, laptops, desktops and VR devices.

Figure 5A:
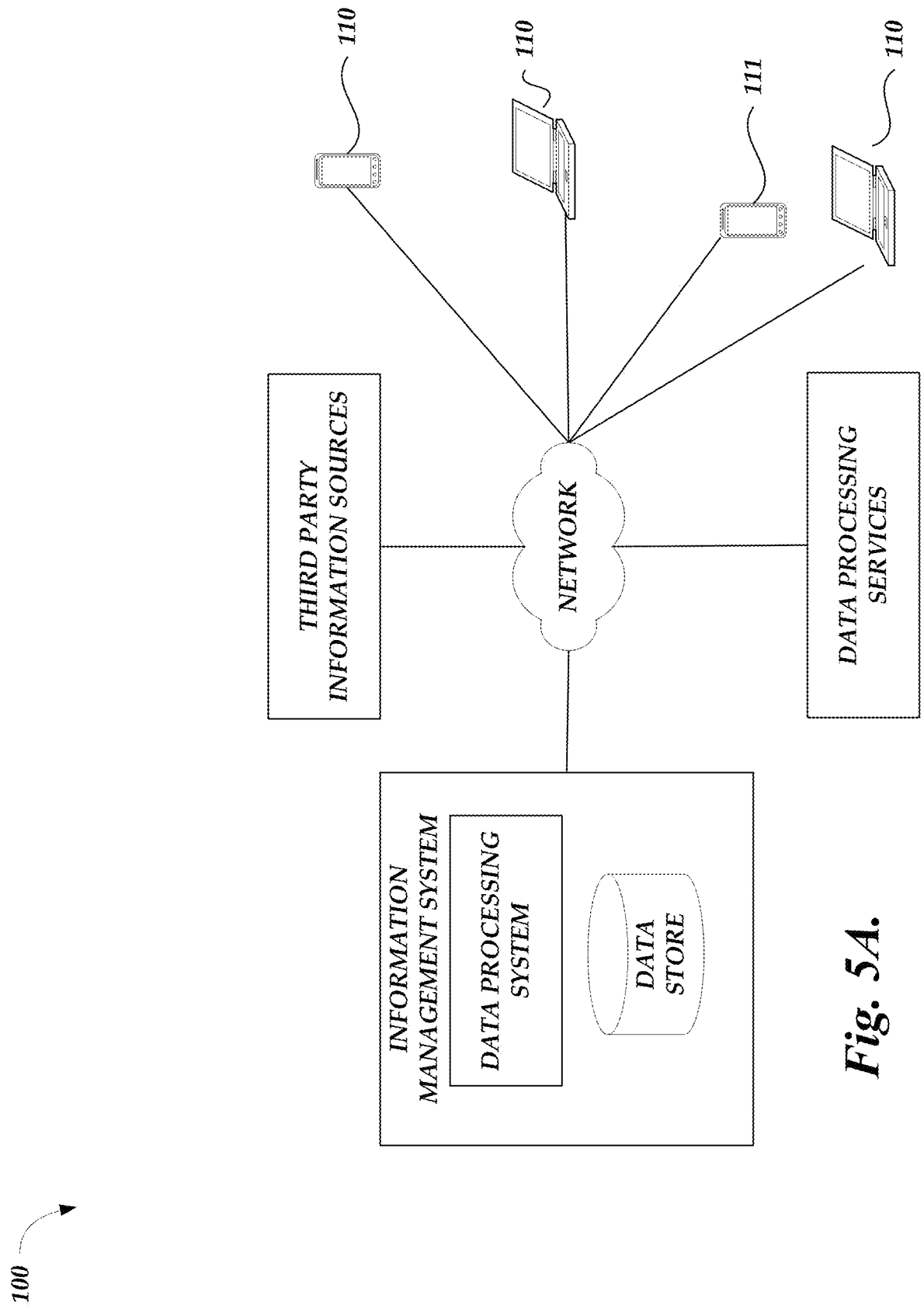
FIG. 5A represents additional aspects of the data processing environment including an information management system that includes a data processing.

FIG. 5A represents additional aspects of the data processing environment including an information management system that includes a data processing system (FIG. 6) and data store that interact with devices 110, 111 as described above. The data processing system further accesses additional network-based resources, such as web sites or other supplemental content delivery.

Figure 6:
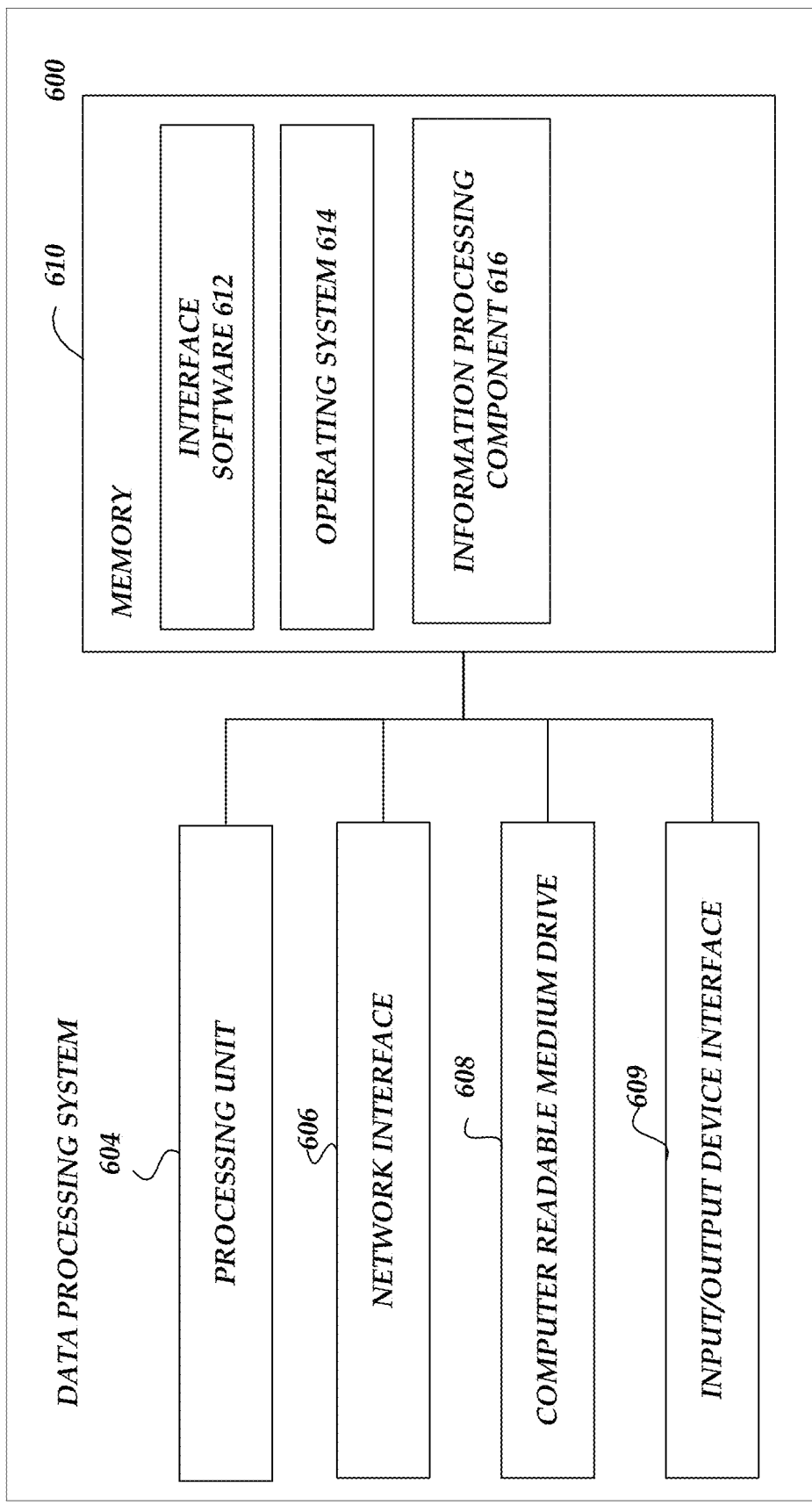
FIG. 6 depicts one embodiment of an architecture of an illustrative computing device for implementing various aspects of the data processing system.

FIG. 6 depicts one embodiment of an architecture of an illustrative computing device for implementing various aspects of the data processing system 600 in accordance with aspects of the present application. The data processing system 600 can be a part of the instantiation of a set of virtual machine instances. Alternatively, the computing device may a stand-alone device forms or functions as the data processing system 600.

The general architecture of the data processing system 600 depicted in FIG. 6 includes an arrangement of computer hardware and software components that may be used to implement aspects of the present disclosure. As illustrated, the data processing system 600 includes a processing unit 604, a network interface 606, a computer readable medium drive 608, an input/output device interface 609, all of which may communicate with one another by way of a communication bus. The components of the computing device 600 may be physical hardware components or implemented in a virtualized environment.

The network interface 606 may provide connectivity to one or more networks or computing systems, such as the network of FIG. 5. The processing unit 604 may thus receive information and instructions from other computing systems or services via a network. The processing unit 604 may also communicate to and from memory 610 and further provide output information. In some embodiments, the data processing system 600 may include more (or fewer) components than those shown in FIG. 6.

The memory 610 may include computer program instructions that the processing unit 604 executes in order to implement one or more embodiments. The memory 610 generally includes RAM, ROM, or other persistent or non-transitory memory. The memory 610 may store an operating system 614 that provides computer program instructions for use by the processing unit 604 in the general administration and operation of the data processing system 600. The memory 610 may further include computer program instructions and other information for implementing aspects of the present disclosure. For example, in one embodiment, the memory 610 includes interface software 612 for receiving and processing requests from the client devices 110, 111. Memory 610 includes an information match processing component 616 for processing the user interactions to create graphical interfaces as described herein.

As specified above, in one embodiment, the data processing system 600 illustrated in FIG. 6 can be implemented as physical computing devices or virtualized computing devices in a computing network. In another embodiment, the data processing system 600 may be implemented as logical components in a virtual computing network in which the functionality of the data processing system 600 is implemented by an underlying substrate network of physical computing devices. Thus, aspects of the present application should not be limited to interpretation requiring a physical, virtual or logical embodiment unless specifically indicated as such.

An example of such a knowledge landscape map 100 is shown in FIG. 1. Referring to that figure, the map includes nodes 1-5, each of which relate to a subject or knowledge topic. As described above, individual nodes in the display portion of the map represents a topic or concept, or may represent a premise or conclusion or theorem for example. Nodes may contain further information, for example in some embodiments nodes may contain links such as a link to online resources or a link to a further knowledge landscape map, which may be manually or automatically actioned activated, to retrieve additional relevant information.

As also previously discussed, connectors 6 show relationships between the nodes such as relationships between the different knowledge topics identified by each node. The connectors 6 show a relationship graphically, but the connectors may include properties or attributes which represent further relationships between nodes that may not be immediately apparent to a user and/or may not be graphically illustrated without user input.

In FIG. 1, the knowledge landscape map 100 shows derivation of the theorem of Pythagoras which is identified in node 1. The learning topics required to derive this theorem are identified in nodes 2-5. The nodes and connectors and their properties or other related information comprise attributes of the knowledge landscape map. The example in FIG. 1 portrays how a user, such as a student, may be presented with a knowledge landscape map defining specific content to be delivered to that user. According to this implementation, the user will be able to visualize how to arrive at the Pythagorean theorem by using the above concepts, and have a graphical interface enabling the user to understand how each of these are connected to each other.

Figure 2:
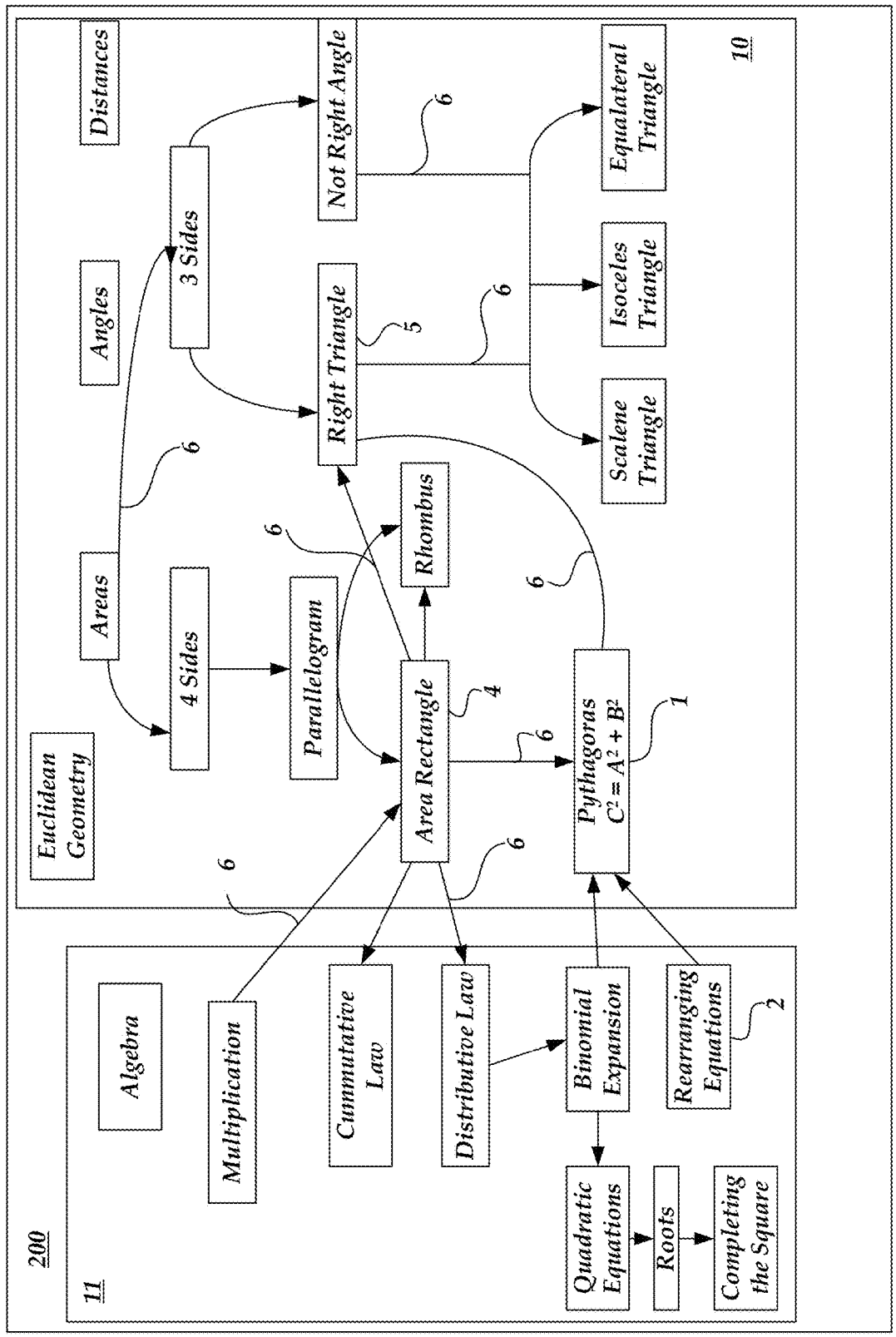
FIG. 2 is a block diagram depicting an illustrative knowledge landscape map in accordance with an aspect of the present application.

Illustrated in FIG. 2 is another knowledge landscape map 200 that shows a wider view of the above problem of deriving the Pythagorean theorem. As previously indicated, nodes and connectors may be grouped, such as according to sub-topics or related topics. For purposes of illustration, such sub-topics or related topics will be generally referred to as neighborhoods. In this illustrative example the diagram of FIG. 1 is augmented with additional interconnected nodes so that the student can see how each of the nodes is part of a wider set of neighborhoods 10, 11. Neighborhood 10 relates to Euclidean Geometry, and neighborhood 11 to Algebra. Nodes 1 and 4 are in the Euclidean Geometry neighborhood 10, but have connections to the Algebraic neighborhood 11. A student can use such a diagram to see how the Binomial Expansion can itself be derived from the Area of a Rectangle using the distributive and commutative laws (depicted in respective nodes).

As will be apparent from FIGS. 1 and 2, a knowledge landscape map 100 or 200 may be embodied in an interactive interface which allows nodes and connections to be selectively revealed (or hidden) to present related topics within a knowledge landscape map. For example, a presentation may be delivered in which the nodes 1-5 and connectors 6 are successively revealed to a user (based on characterized interactions), and that may continue with the additional nodes and connectors shown in the map 200. Consequently, providing a knowledge landscape map, such as maps 100 or 200 depicted in FIGS. 1 and 2, respectively, will ultimately aid in an enhanced learning experience for a content delivery recipient such as a student.

Figure 3:
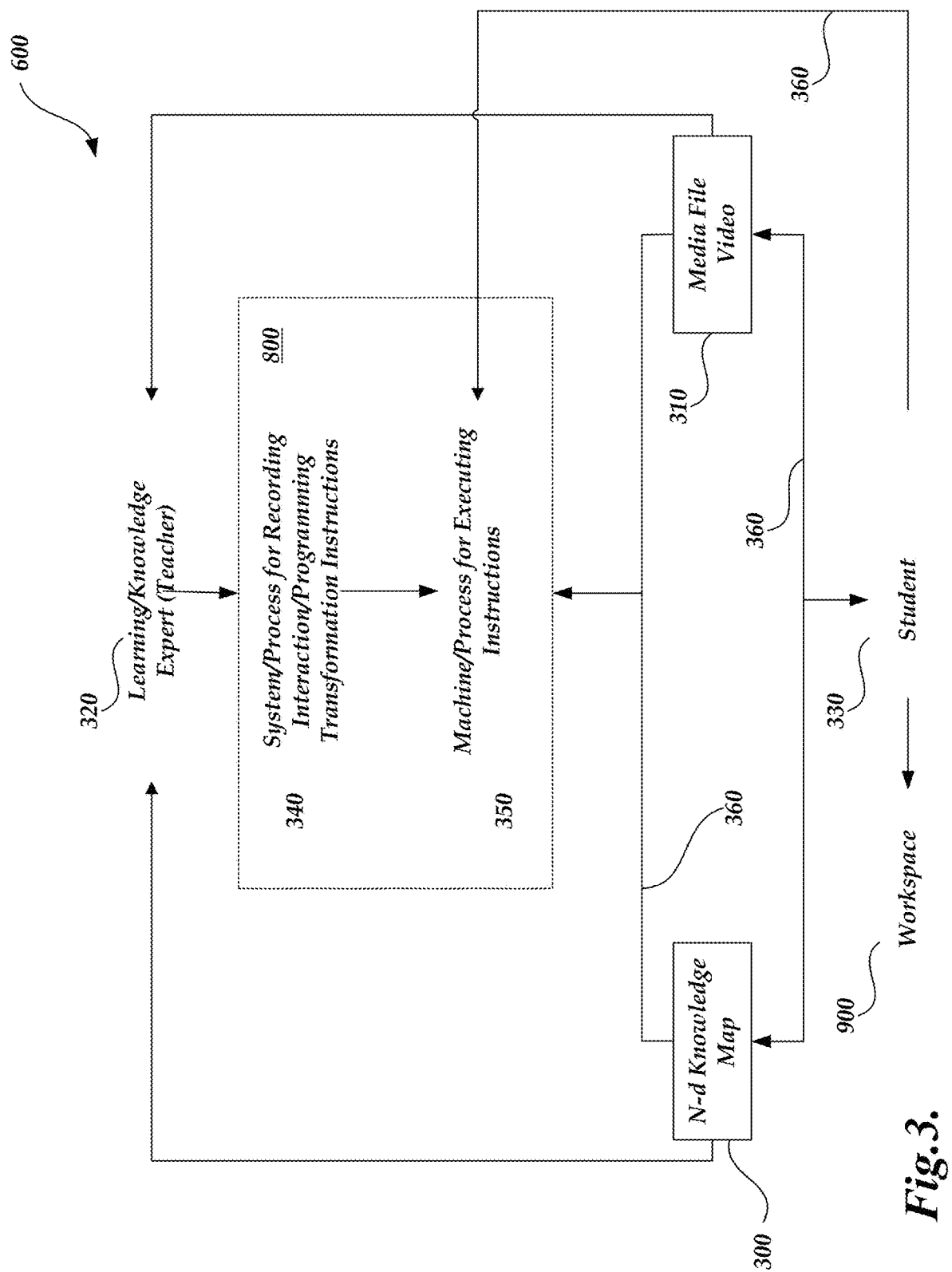
FIG. 3 is a flow diagram depicting an illustrative processing of user input.

An overview of the use and functionality of the data processing system 600 (FIG. 6) disclosed herein is shown in FIG. 3. More specifically, FIG. 3 represents embodiments related to a learning environment. Such embodiments are illustrative in nature and should not be construed as limiting. Referring to FIG. 3, it will be seen that the platform includes two sources of information provided in digital form. The first is data relating to a knowledge landscape map 300 which is configured to be represented graphically as shown in the examples of maps 100, 200 in FIGS. 1 and 2. The second source of information is appropriate media data, such as one or more media files 310. Illustratively, individual media files are associated with a topic that relates to at least one of the nodes or connectors of the knowledge landscape map 300.

The platform allows a user 320, who can be a teacher or instructor, to record or produce an interactive presentation in which the content of a video and knowledge landscape map is provided to another user. In a learning embodiment, the other user can correspond to a student 330. The teacher 320 may have been the person who also produced the media file 310 and/or the knowledge landscape map 300. An interactive presentation, as described in this document, is one in which a user such as a teacher or student can interact with a device on which the presentation is being run and influence the presentation through that interaction. For example, the student may want to navigate to an attribute in the knowledge landscape map 300. The user may do this by using a touch screen or pointing device to select a graphical representation of the attribute, such as a node, of interest and the effect of this will be to locate and run the relevant media data that relates to the knowledge topic embodied in the selected node.

The knowledge landscape map 300, as implemented digitally, may have properties beyond the two-dimensional diagram discussed above. For example, the digital representation allows more than two dimensions to be represented, for example there may be three-dimensional, or multiple two-dimensional instances, of the knowledge landscape embodied in the map. For example, a set of two-dimensional instances may be combined into a layered knowledge landscape map. Thus the knowledge landscape map 300 as represented digitally (which will be described further below) may be considered to be n-dimensional, and thus provides a much better representation of the interconnected nature of knowledge than is possible with a paper diagram.

The terms knowledge landscape map and n-dimensional knowledge landscape map are used synonymously herein.

Illustratively, an n-dimensional knowledge landscape map 300 contains among other items a representation of multiple knowledge components generally referred to herein as nodes, including how these various knowledge components are related to each other. Additionally, in some examples the n-dimensional knowledge landscape may contain internal processes and algorithms which manipulate or alter the content of the n-dimensional knowledge landscape based on inputs provided to the n-dimensional knowledge landscape by the user directly, whether that be the teacher 320 or student 330, or indirectly. An n-dimensional knowledge landscape may produce outputs based on inputs provided to it or actions performed by the internal processes and algorithms.

Figure 4:
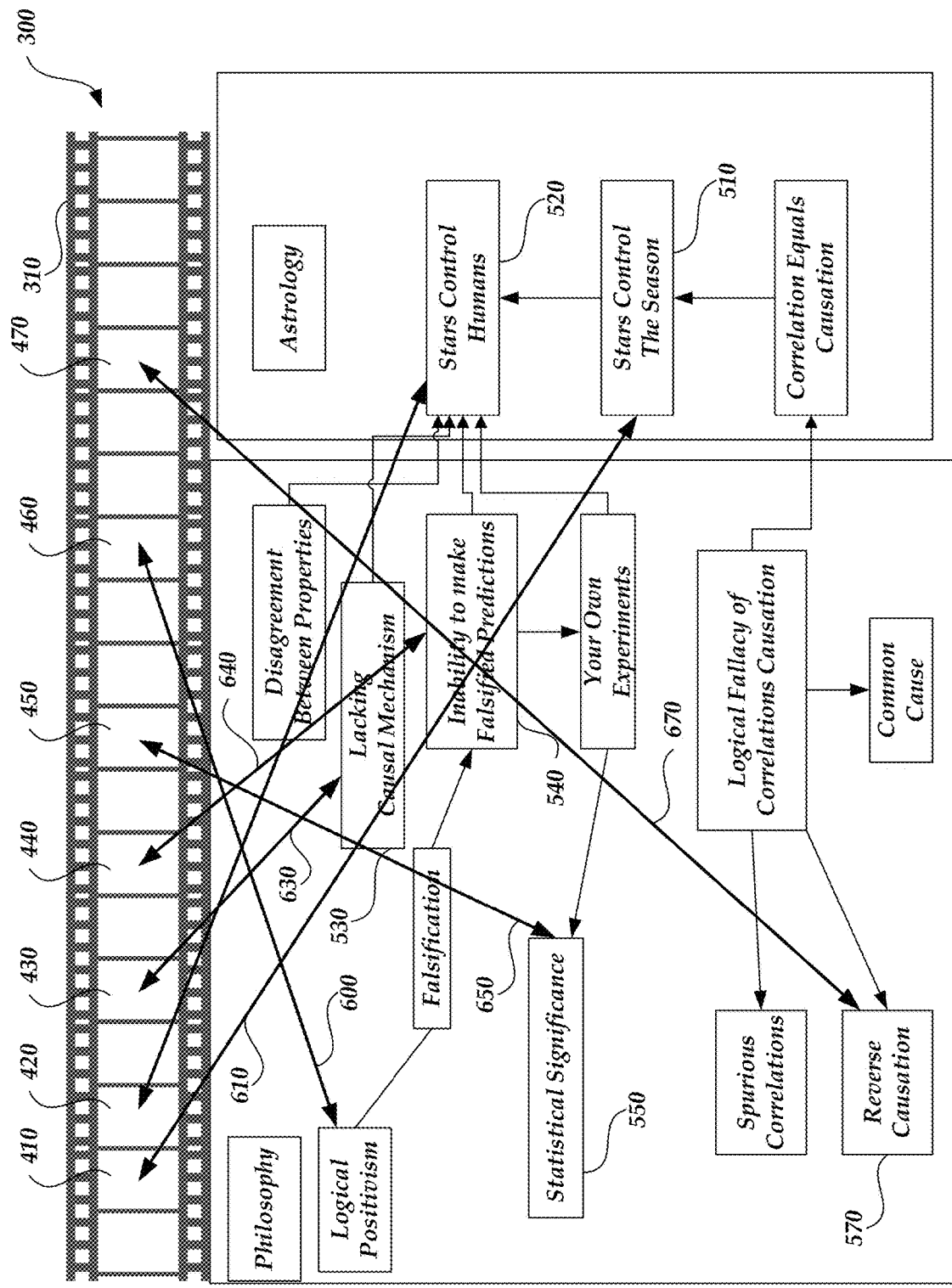
FIG. 4 is a block diagram depicting an illustrative mapping of a knowledge landscape map to a set of video segments in accordance with aspects of the present application.

An illustrative example for producing an interactive presentation is shown in 340 of FIG. 3 and includes linking the media data 310 with the knowledge landscape map data 300. Ideally, this is done using the data processing system 600 (FIG. 6) to combine the information in a way which provides an enhanced learning experience for a student. A diagrammatic example of this process is shown in FIG. 4, in which the media data 310 is represented figuratively as an array of blocks or data 410-470, each block comprising a frame or frame sequence which are linked or mapped to nodes 510-570 of the knowledge landscape map 300. The mapping is indicated by arrows 610-670, which are double ended to indicate the bi-directionality of the association i.e. navigation to node 550 of the knowledge landscape map reveals frame sequence 450 of the media data, and navigation to frame sequence 450 of the media data reveals node 550 of the knowledge landscape map.

If a node is mapped to a plurality of frame sequences, then the user can be prompted to select which frame sequence to navigate to.

The production system has knowledge of all the functionality embedded in the n-dimensional knowledge landscape map including the different types of inputs it can receive. Illustratively, the modifications to the n-dimensional knowledge landscape map such as editing a node etc. or the outputs it can produce that will be used by the control module to modify the n-dimensional knowledge landscape and/or the display of the media file. The modifications can also include the internal algorithms and processes the n-dimensional knowledge landscape can perform on itself (e.g., finding all information in the n-dimensional knowledge landscape that might be required to derive a mathematics formula like Pythagoras—said information being embodied in the connections and nodes).

Thus the data processing system 600 includes a user interface allowing the teacher to assign to any specific occurrence of information in the media data, a related attribute of the knowledge landscape data, or an action to be performed in the representation of the knowledge landscape, when that specific occurrence is detected. In some examples or embodiments, the specific occurrence of information may comprise a frame or frame sequence of the media file. Such actions include any or multiples of the items listed above.

To record the assignment of a specific occurrence of information in the media data with the knowledge landscape map data (or an action to be performed on the knowledge landscape map), an administrator (such as an instructor) can configure the n-dimensional knowledge landscape using the native UI of the n-dimensional knowledge landscape in whatever fashion they like, and the system can automatically record those actions and assignments without the teacher having to understand the complex details of those manipulations or the programming constructs needed to execute them. The data processing system 600 records all underlying actions to be executed when the media file plays a frame or an action is executed on the n-dimensional knowledge landscape. This is explained further below.

Conversely, the data processing system 600 provides a user interface allowing the teacher to assign to each attribute in the n-dimensional knowledge landscape a reference to specific information in the media data, or an action to be performed on the media file. Because the n-dimensional knowledge landscape map can also output actions, the teacher can also assign how these outputs may control or manipulate the media file on any other connected device if a user (student) interacts with the n-dimensional knowledge landscape while the media file is being played. In this case, the n-dimensional knowledge landscape effectively takes control of the media file.

Additionally, the system provides a seamless user interface allowing the teacher to assign to each item in the n-dimensional knowledge landscape map an action to be performed by the n-dimensional knowledge landscape or any internal algorithm, function or process contained inside the n-dimensional knowledge landscape map.

The recording component of the data processing system 600 allows the administrator to configure the interaction between the media file and the n-dimensional knowledge landscape in a way that is ideal for the target student(s), and in such a manner that it that makes more efficient use of computational resources and promotes learning.

As shown as the use of control module 350 of FIG. 3, the student may interact with the media file(s), n-dimensional knowledge landscape map, and control module. Regardless of the combinations, the control module then knows how to control both the selected media file and the n-dimensional knowledge landscape map based on the instructions provided by the teacher. These interactions are shown in FIG. 3 by the bidirectional arrows 360.

At any time, the student can switch between any of four methods (as described further below) and the control module 350 is able to execute the student's inputs based on the current state of the media file, the n-dimensional knowledge landscape map, the n-dimensional knowledge landscape map's internal algorithms and functions, and the student's inputs.

The control module not only controls both the media file and the n-dimensional knowledge landscape map, but also controls the size and position of the windows or separate screens in which the media file and n-dimensional knowledge landscape map are displayed.

The platform enables the n-dimensional knowledge landscape map to be created and captured in a digital form that is appropriate for presentation in a graphical workspace via an output device such as a visual display unit. This is effected in one example to provide interactive functionality using the data schema set forth in tables 1-5 below.

Interactive knowledge landscape maps and related interactive presentations are both generated based on content that can be written to and read from a database/data store in program data 678. The tables 1-5 below detail the main properties of the entities that comprise this content. Administrative properties (e.g., last update date, last update user, document owner) have been omitted. Each entity is assumed to have an additional property that can store any required entity data that doesn't have a specific associated property.

The application programs 676 to produce the graphical representation of the knowledge landscape map and make it available to video interface 650, and to receive user input via interface 620 to enable interactivity.

TABLE 1

Interactive Knowledge Landscape Map Attributes

| Property | Description |
|---|---|
| ID | Unique Identifier to allow referencing from other entities (e.g., Interactive Presentation) |
| Nodes | Collection of Node entities (see "Node Attributes" below) |
| Connectors | Collection of Connection entities (see "Connector Attributes" below) |
| Shares | List of users with rights to access this Knowledge landscape Map (see "Share Attributes") |

TABLE 2

Interactive Presentation Attributes

| Property | Description |
|---|---|
| ID | Unique Identifier to allow referencing from other entities |
| Name | Description of the "Interactive Presentation" |
| Knowledge landscape Maps | Collection of Knowledge landscape Map that this "Interactive Presentation" is based on |
| Media URLs | Collection of Universal Resource Locators specifying the location of Media files/streams/sources that this "Interactive Presentation" uses. |
| Actions | List of actions to be performed in "Interactive Presentation" (see "Action Attributes") |
| Shares | List of users with rights to access this Interactive Presentation (see "Share Attributes") |

TABLE 3

Node Attributes

| Property | Description |
|---|---|
| ID | Unique Identifier to allow referencing from other entities (e.g., Connections) |
| Title | Brief description of the node in a structured format that supports all font styling (Font, Font Size, Font weight, Font Color, etc.). |
| Content | Rich content of the node in a structured format that allows access to all elements including (but not limited to): Formatted text Images Videos Math Formulae Interactive animations Links to external content (e.g., web pages, videos) Links to other nodes Links to other Knowledge landscape maps/Knowledge landscape Maps |
| Background Color | Color used as a background for the node title |
| Show Content | Boolean flag the indicates if the node content should be displayed inline (i.e., within the boundaries of the node) or in a separate content window |
| Position | X, Y & Z position where the node should be displayed (Z used when node represented in 3D) |
| Layer ID | Reference to unique layer ID that the node should be shown in. |

TABLE 3-continued

Node Attributes

| Property | Description |
|---|---|
| Width | The width of the node representation |
| Height | The height of the node representation |
| Depth | The depth of the node representation (used when node is represented in 3D) |
| Visible | Boolean flag indicating if the node should be displayed |
| Image | Optional image to display (images can also be in the "Content" but if "Show Content" is false this "Content" will not show at the node location.) |
| Image Title Display | Property indicating if the Title, Image or Title & Image should display. |
| Show Descendants | Boolean flag indicating if descendant nodes should be visible. A descendant node is the "To" node in a connection "From" the current node where the connection type supports collapsing. |
| Show Ascendants | Boolean flag indicating if ascendant nodes should be visible. An ascendant node is the "From" node in a connection "To" the current node where the connection type supports collapsing |

TABLE 4

Connector Attributes

| Property | Description |
|---|---|
| ID | Unique Identifier to allow referencing from other entities (e.g., Actions) |
| From Node ID | Reference to "From" Node that this connection connects from |
| To Node ID | Reference to "To" Node that this connection connects to |
| From Location | Auto or reference to the "From" node side that the connection should connect to. |
| To Location | Auto or reference to the "To" node side that the connection should connect to. |
| Type | See "Connection Types" |
| Content | Rich content of the connection label in a structured format that supports all font styling (Font, Font Size, Font weight, Font Color etc.) |
| Line Type | Controls the path taken by the connector. See Line Types |
| Visible | Boolean flag indicating if the connection should be displayed. |
| Color | Connection color is calculated based on other connection attributes. |
| Line Style | The line style (dash pattern) is calculated based on other connection attributes. |
| Line Width | The line width is calculated based on other connection attributes. |

TABLE 5

Share Attributes

| Property | Description |
|---|---|
| ID | Unique Identifier to allow referencing from other entities. |
| User ID | Unique Identifier for the user being given access. This could be a reference to another entity |
| Write Access | Boolean indicating if the user can update the knowledge landscape map (a user with a share will always have "Read Access". |

In some embodiments, the media file comprises media data which may be in a variety of different formats. Irrespective of format, decompressed and decoded media data has a number of different attributes that enable a specific occurrence of information in that data to be identified. Those skilled in the art will appreciate that a reference may be established using any of the available attributes, including without limitation a frame reference, an SMTPE code, or elapsed time i.e. the time during the playing of the media file at which the specific occurrence of information occurs.

The references to specific occurrences of information in the media data comprises control metadata 700 which directly or indirectly maps those references to attributes of the knowledge landscape map. The control module uses the control metadata to control the presentation of the appropriate media data with the identified graphical feature(s) (e.g., attribute(s)) of the knowledge landscape map, and vice versa). An identified feature refers to a feature of the knowledge landscape map, such as a node or connector, that has been revealed or highlighted, or simply selected by a user using a pointing device or keyboard.

Figure 7:
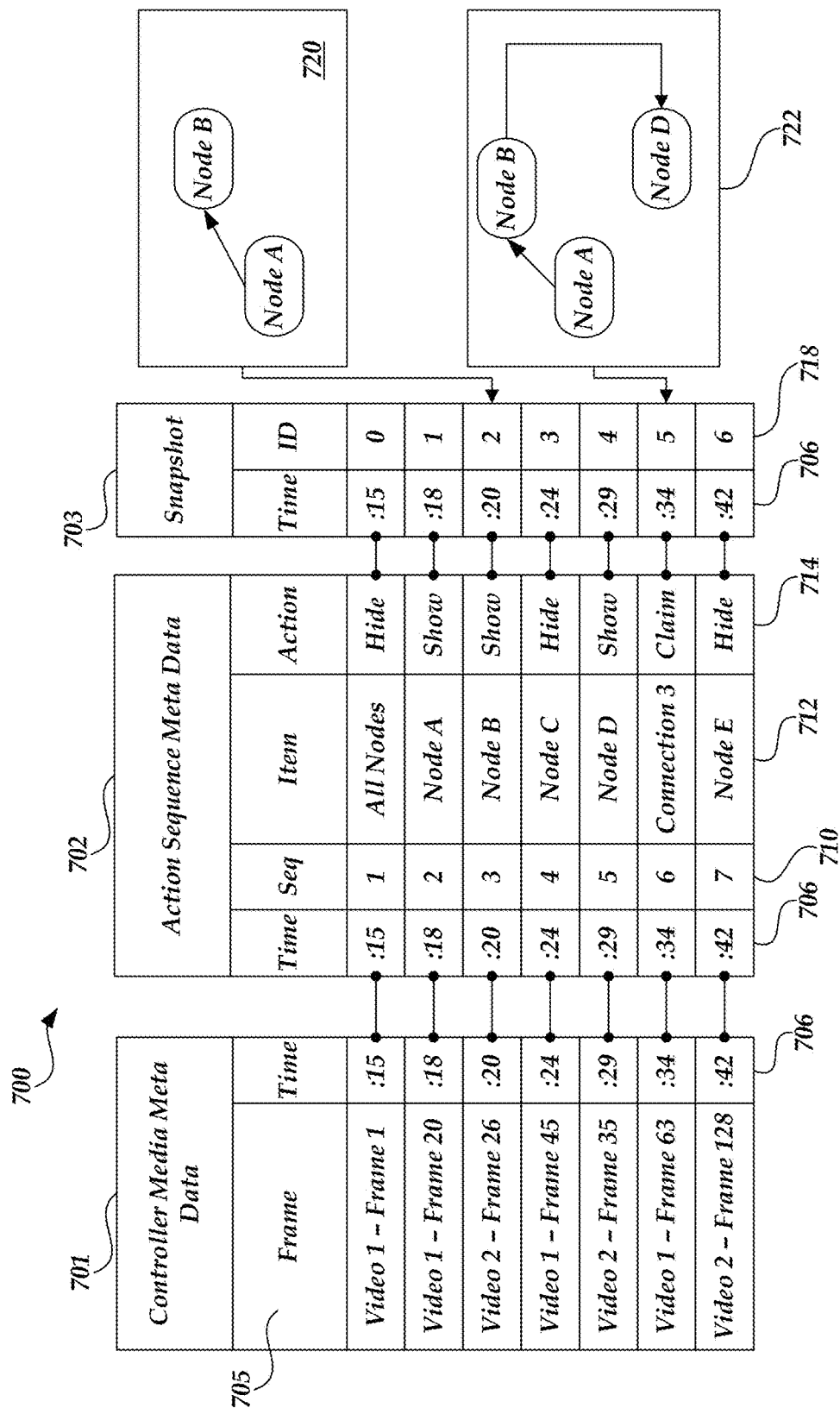
FIGS. 7, 7A, and 7B are block diagrams of a table illustrating control metadata mapping in accordance with aspects of the present application.

A table illustrating control metadata mapping is shown in FIG. 7, in which the media data specific reference 705 is mapped to a snapshot ID 718 which corresponds to an arrangement of attributes of the knowledge landscape data, the function of which will be described further below. In this example, the reference 705 comprises the starting point of the frame sequence of interest, but as described earlier, this could be another suitable parameter such as elapsed video play time for example. It will be seen that media data from multiple sources or files, in this case two videos, can be used.

In the example shown, the control metadata comprises three tables, being the controller media metadata table 701, the action sequence metadata 702, and the snapshot metadata 703.

Table 701 maps the reference 705 to an elapsed controller time. The elapsed controller time is the time from the beginning of a learning presentation. Table 702 maps the elapsed controller time 706 to a sequence ID which is the identity of each step in the sequence that the control module runs through to deliver the presentation. The item column 712 comprises the attributes of the knowledge landscape map that relate to the knowledge topic of the media data. Column 714 comprises the action that is associated with the attributes. Table 703 maps or links the elapsed controller time to a snapshot ID. In one embodiment or example, the control module can drive the required graphical output without table 703. However, in another embodiment table 703 is used so that the elapsed controller time is used to locate a snapshot ID. Each snapshot ID corresponds to a visual or graphical state of the knowledge landscape map. This means that the knowledge landscape map can be much more quickly represented as it changes throughout the presentation. Thus in FIG. 7, visual map instantiation or state 720 corresponds to snapshot ID 2. This is because in the presentation sequence Node A has already been revealed. Now, at Video 1, frame 28 the required action is to reveal node B, so the visual state 720 shows node A and node B, together with the connector. Similarly, at snapshot ID 5, connection 3 is revealed, so visual state 722 depicts knowledge landscape map up to and including that action.

Figure 7A:
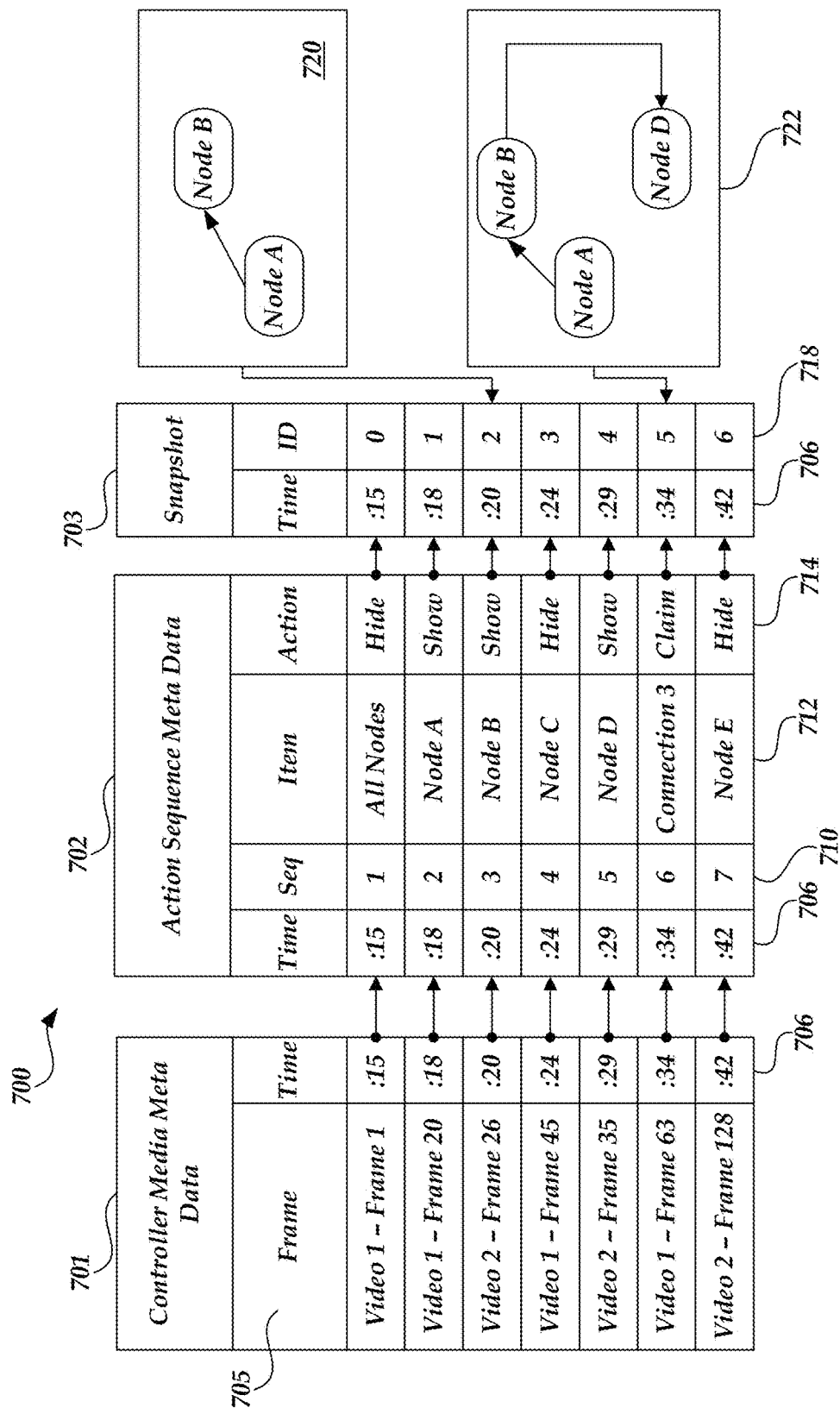
Figure 7B:
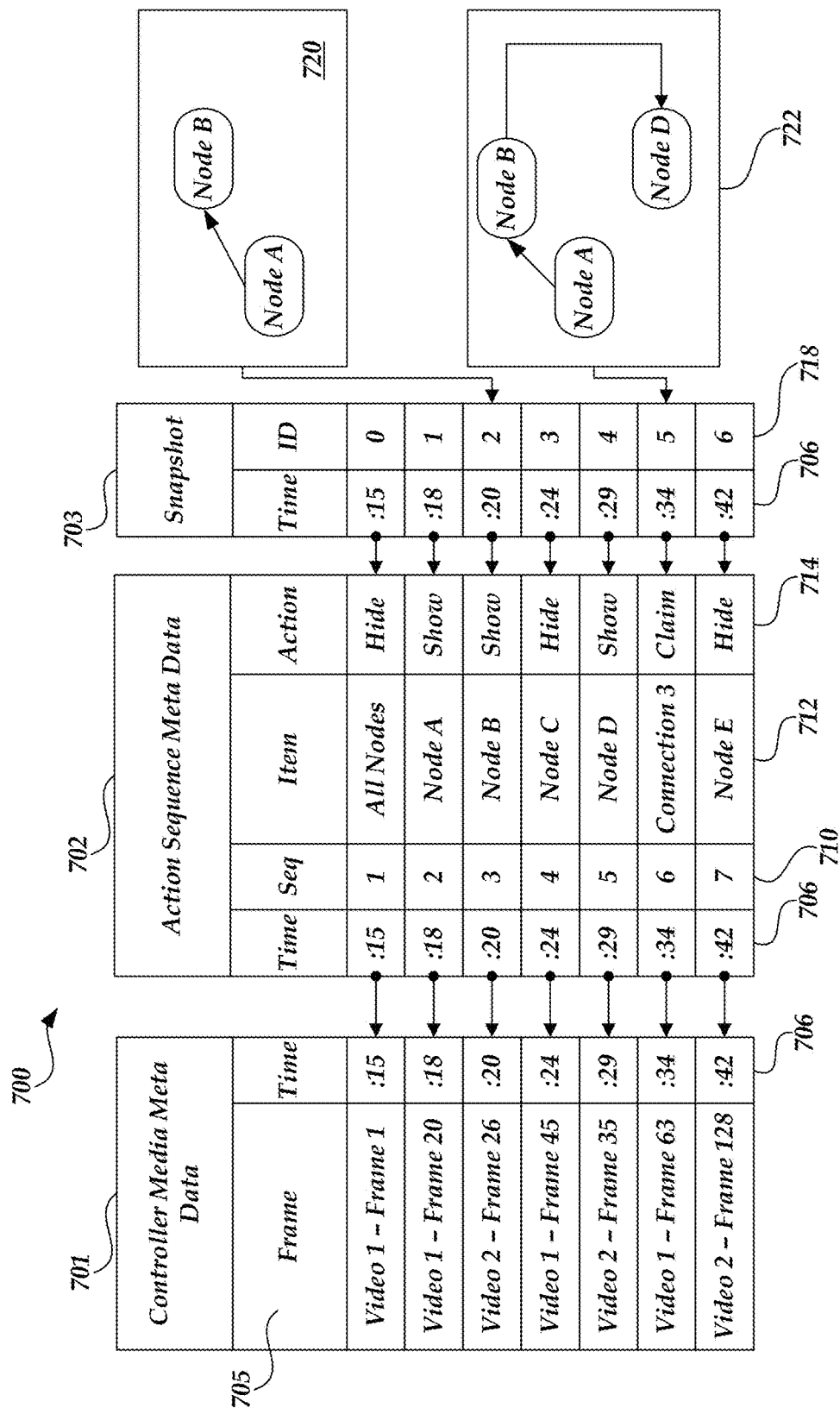

FIGS. 7A and 7B show using arrows between the tables 701, 702 and 703 how that data can be linked to facilitate synchrony between the videos and the knowledge landscape map being displayed when inputs are being driven by the media data (FIG. 7A) or the landscape map data (FIG. 7B).

Figure 8:
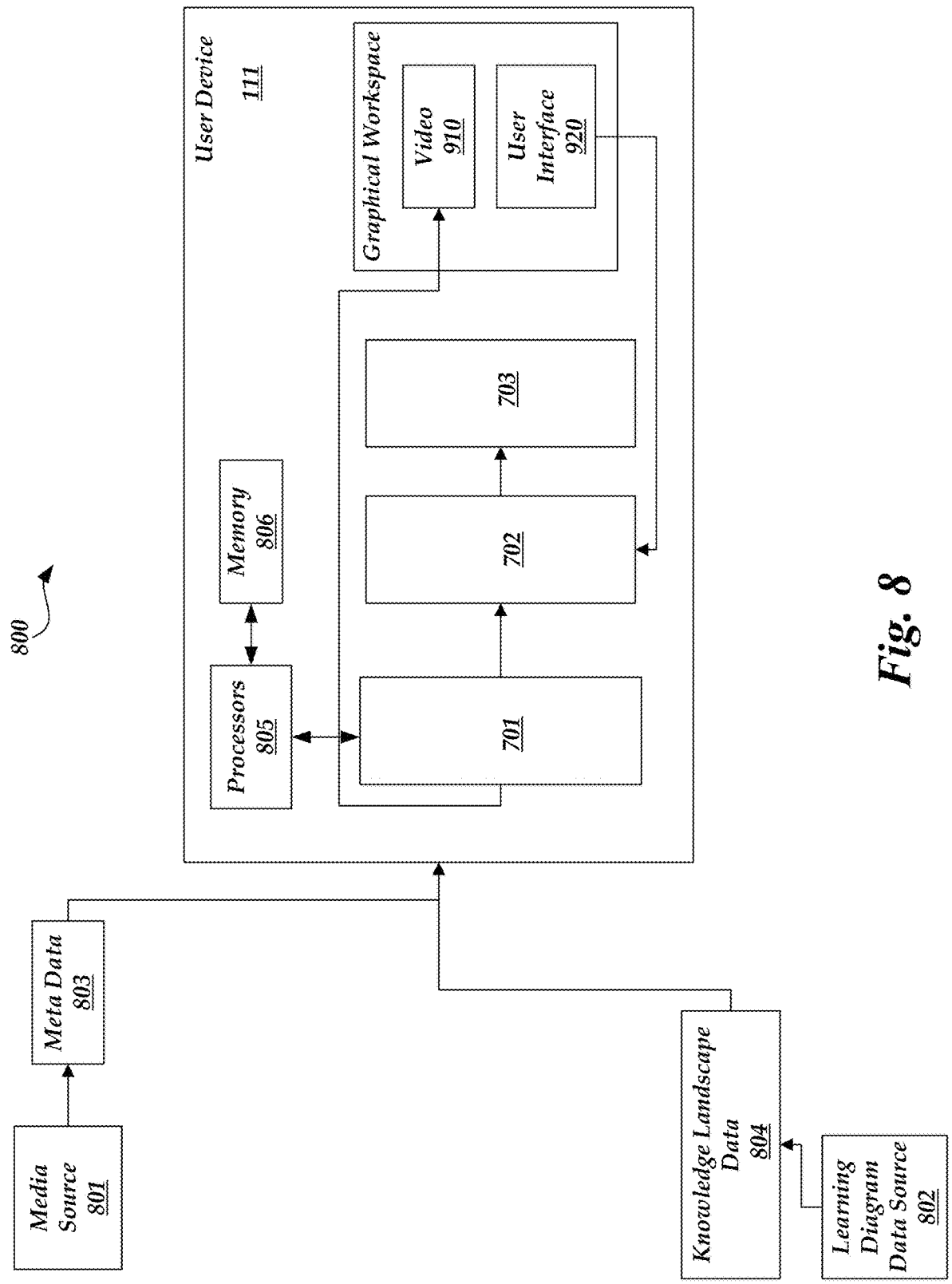
FIG. 8 depicts an illustrative learning platform including a user device, media data and knowledge landscape data in accordance with aspects of the present application.

FIG. 8 shows an overall schematic for the data processing system 600 (FIG. 6) 800 and identifies diagrammatically one example of implementation on a user device 111. Media source 801 provides media data 803, and knowledge landscape map data source provides knowledge landscape map data 804. Memory 806 contains the encoded instructions for the control module and the control metadata represented in this example as tables 701-703 (FIGS. 7A and 7B). Processor 805 acts on the instructions, control metadata, media data and knowledge landscape map data to provide a graphical output to graphical workspace 900 which may include a media-based learning window 910 in which media data is played, and a knowledge landscape map-based learning window 920 in which part or all of the knowledge landscape map is displayed.

Still referring to FIG. 8, operation of the system can be described with reference to some examples.

In a first example, if a user begins playing video 1 for example, then after 15 seconds all nodes are hidden. If the snapshots embodied in table 703 are used, then snapshot ID 0 which would result in blank window 920 by removing Node A and Node D and the connector between these nodes is used by the system. At frame 28 of video 1, node B is revealed which is effected using snapshot ID 2. If a user pauses the video, then the control module pauses and the knowledge map visual representation is paused until such time as play resumes. If a user skips to a particular elapsed time in the media file (for example using a pointing device in the graphical workspace), then that is detected by the control module so that the control metadata is used to identify the related action. If, for example, the user skips forward in video 1 to frame 63, then the control module can map this to the intended controller elapsed time to see that the related action sequence item is item 6, and the corresponding snapshot ID is 5 for the purposes of updating the knowledge landscape map window.

In a second example, if a user input is to play a presentation, then the control module steps through the sequence IDs, beginning at 1, with the controller elapsed time governing when to increment to the next step. Thus, step 1 lasts for 15 seconds before step 2 in the sequence begins. The control module uses the control metadata to locate the relevant video and specific reference (e.g., frame) within the video data. Similarly, the control module uses the control metadata to identify the action and/or the snapshot ID for updating the knowledge landscape map window.

In a third example, if a user wants to select an attribute of the knowledge landscape map (whether something already covered in the presentation or something not yet covered), then the user can select a particular attribute of the knowledge landscape map, then the control module can use the control action sequence metadata 702 to link the attribute with the related action sequence item ID and/or elapsed controller time. This allows the control module to select the related media data reference (e.g., the related frame or elapsed video time) in the media file that is relevant to the action sequence item. For example, if the user selects Node D, the control module identifies action sequence item ID 5 from the action metadata 702. The control module can then use the control metadata to identify the reference (which may be the elapsed time) to video 2, frame 35. That reference is used by a media player on the user's device to navigate the media file i.e. scrub, skip or jump, to the selected location in the media file so that frame 35 of video 2 begins playing in the graphical workspace. Thus the graphical portrayals of the media data and the knowledge landscape map are in synchronism.

As will be described below, a user may use the graphical workspace provided to assign a relevant scene (for example by viewing a video and inputting start and end points) with an attribute of the landscape map (for example by identifying the node or connector on the map). These actions produce the control metadata, such as that illustrated by example in FIG. 7, which is then used to control a presentation.

Examples of action attributes, action types, connection types and line types relating to the knowledge landscape map are shown below in tables 6-9.

TABLE 6

Action Attributes

| Property | Description |
| --- | --- |
| ID | Unique Identifier to allow referencing from other entities. |
| Type | The "Action Type" to be performed. See Action Types. |
| Delay | Time Delay from the previous action after which this action should be executed. |
| Node ID(s) | Reference to the Node related to this Action (if the action relates to a Node) |
| Connection ID(s) | Reference to the Connection related to this Action (if the action relates to a Connection) |
| Action Specific Attributes | Actions have other attributes that are specific to the Action. These are listed under "Action Types" below. |

TABLE 7

Action Types
The "Action Types" listed below are a subset of the supported "Action Types". The full list of "Action Types" includes actions that are required to generate a map.

| Action Type | Description | Parameter(s) |
| --- | --- | --- |
| Show Node | Shows an "Knowledge landscape Map" node | The "Node ID" |
| Hide Node | Hides an "Knowledge landscape Map" node | The "Node ID" |
| Select Video | Selects a video file | The video URL |
| Seek & Play Video | Seeks to the specified elapsed time and plays from there | Elapsed Time |
| Pause Video | Pauses a video | N/A |
| Play Video | Plays video from current position | N/A |
| Open "Knowledge landscape Map" | Opens an "Knowledge landscape Map" | The "Knowledge landscape Map" ID |
| Show Node Content | Shows the content of a node | The "Node ID" |
| Hide Node Content | Hides the content of a node | The "Node ID" |
| Zoom to neighborhood | Changes the page zoom & pan so that all the nodes in a neighborhood are shown | The neighborhood |
| Dock Video Window | Dock the "Video Window" in the "Knowledge landscape Map" | The dock location (e.g., Top Left, Top Right, Bottom Left, Bottom Right) |
| Maximize Video Window | Maximize the video window | N/A |
| Connection Line Type Update | Change the "Line type" of a connection (See "Line Types") | The "Connection ID" and the new "Line Type" |
| Connection Type Update | Change the "Type" of a connection (See "Connection Type") | The "Connection ID" and the new "Connection Type" |
| Reverse Connection Direction | Reverse the direction of a Connection by swapping the "From" and "To" nodes | The "Connection ID" |
| Highlight Node | Highlight a node | The "Node ID" of the node to be highlighted/un-highlighted and a Boolean indicating which of these options to perform |
| Highlight Node | Highlight a connection | The "Connection ID" of the connection to be highlighted/unhighlighted and a Boolean indicating which of these options to perform. |

The "Action Types" listed below are a subset of the supported "Action Types". The full list of "Action Types" includes actions that are required to generate a map.

TABLE 8

Connection Types

| Value | Description |
| --- | --- |
| 1 | Relative |
| 2 | Group |
| 5 | Generic |
| 8 | Bi-directional |

TABLE 9

Line Types
Defines the type of line used to connect nodes

| Value | Description |
| --- | --- |
| 1 | Auto - The system automatically selects the line type (2, 3 or 4) based on the nodes being connected based on sibling or parent nodes layout. |
| 2 | Curve - Bezier curve between from & to connection locations. The Bezier curve is usually constrained to exit/enter the node at right angles. |

TABLE 9-continued

Line Types
Defines the type of line used to connect nodes

| Value | Description |
|---|---|
| 3 | Elbow - Multiple straight lines connected at right angles between from & to connection locations |
| 4 | Straight - Straight line between from & to connection locations |

Defines the type of line used to connect nodes

Dependent on various parameters and data streams that the devices within the network environment receive, the present application is configured to generate graphical workspace 900 to render an interactive presentation and ultimately aid in an enhanced learning experience for a user. The interactive presentation may comprise an augmented visual representation of data obtained from a media source and the knowledge landscape map. In other examples as will be evident in this document, the interactive presentation may also comprise an augmented visual representation of data obtained via the control module action sequences and the control module. Note that in some embodiments the workspace may be distributed across separate displays or devices. For example, the media window 910 can in some embodiments be provided on a television screen while the knowledge landscape map window 920 is provided on another device, for example a cellular telephone, tablet or laptop.

The media-based learning window 910 may include a media player to play and/or seek the media data describing a learning topic (for e.g., Astronomy). The media data may comprise data from one or more data sources, including, but not limited to: audio data, video data, audio visual data, machine-readable data, augmented-reality data, or virtual reality data. The learning topic in the media-based learning window may be presented in user perceptible form. As video it can be portrayed in the space 910. If it is audio, then the data is sent to an output peripheral interface. If desired, a representation, e.g., text, of the audio information being provided can be displayed in the space 910. If video is being displayed, then this will typically comprise a plurality of frames/frame sequences assembled from the media data. Besides the obvious meaning of the word frame in relation to video context (e.g., a still image from a video), and the usage in audio codecs like MP3, a frame may also be used as a name for all the samples in a bundle with several channels, which belong to the same point in time. One particular example is the S/P-DIF interface transporting a stereo signal, which consists of two channels, typically a left and a right side signal. Within this interface, a frame is defined to encompass all the bits that correspond to a single sampling instant. A frame may be said to consist of two subframes, one for each channel. A subframe holds the sample itself, and several additional bits which are used for synchronization of the associated data.

The knowledge-landscape map-based learning window 920 may comprise a knowledge landscape map visualizer 922 to depict knowledge landscape map data comprising graphical objects which relate to a library of map attributes, for example nodes, connectors and the connector types as disclosed in the foregoing tables, visually to the user. As described above, the knowledge landscape map is constructed based on the knowledge contained within the learning topic, for example the big bang theory, formation of galaxies, formation of stars and formation of planets, etc. and their interrelationships. This knowledge within the learning topic is presented in the form of nodes and their interrelationships are shown using the functional connectors.

A user may generate a knowledge landscape map in the knowledge landscape map-based learning window 920. This is achieved by the user selecting attributes of the knowledge landscape map from a library of attributes, for example selecting a node, then another node, then selecting a connector to span the nodes. The landscape map is portrayed in the space 920 as it is constructed. The control module records the nodes, the data (e.g., topic or descriptive text) relating to each node, and the connectors and connector types between the nodes.

The generation of the knowledge landscape map may be based on the knowledge contained in the media data defining that learning topic. Alternatively, the system is also capable of generating media data/media content in the media-based learning window depending on the information present in the knowledge landscape map defining the learning topic. For each learning topic, the content encompassed within the plurality of the frames of the media data and the knowledge landscape map data can be correlated to each other such that, any change/manipulation in one of the frames of the media data and/or knowledge landscape map data of the knowledge landscape map can be visualized in the graphical workplace in synchronism. The change/manipulation to the frames of the media data and/or the knowledge landscape map data of the knowledge landscape maps are orchestrated by the control module and will be described in detail below.

Figure 9:
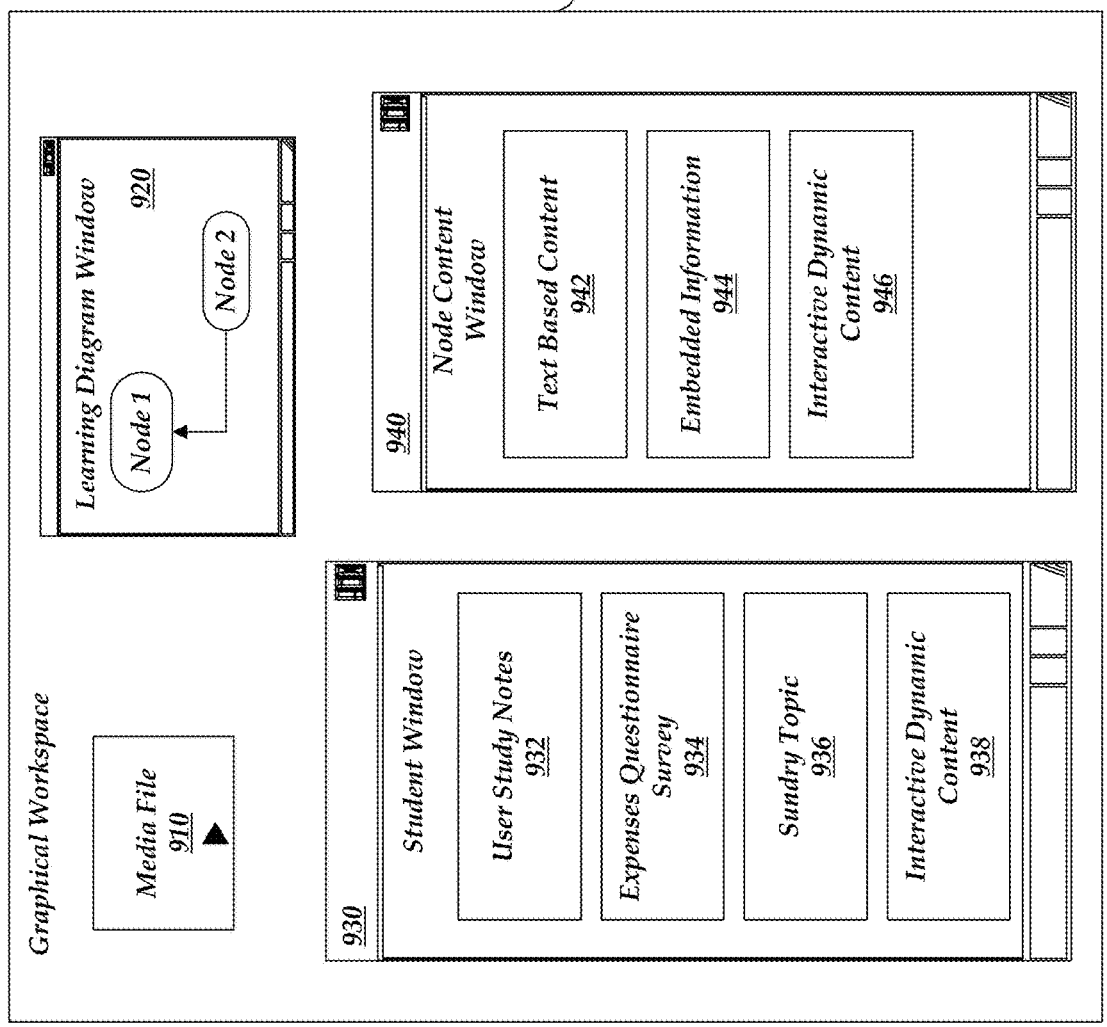
FIG. 9 depicts an illustrative graphical workspace including multiple windows based on role in accordance with aspects of the present application.

In another implementation, the graphical workplace 900 can be augmented according to an example embodiment 1000 as depicted in FIG. 9. In this implementation, the graphical workplace comprises multiple learning areas/windows including a media-based learning window 910, a knowledge landscape map-based learning window 920, a student window 930 and a node content window 940. The student window 930 and the node content window 940 may further comprise sub windows for recording, editing, storing, collaborating, and sharing content. The sub windows that may be provided in the student window 930 include a user study note sub window 932, exercise/questionnaire survey sub window 934, sundry topic related information sub window 936 and interactive dynamic content sub window 938. The sub windows that may be provided in the node content window 940 include text based content sub window 942, embedded information sub window 944, and interactive dynamic content sub window 946.

Figure 10:
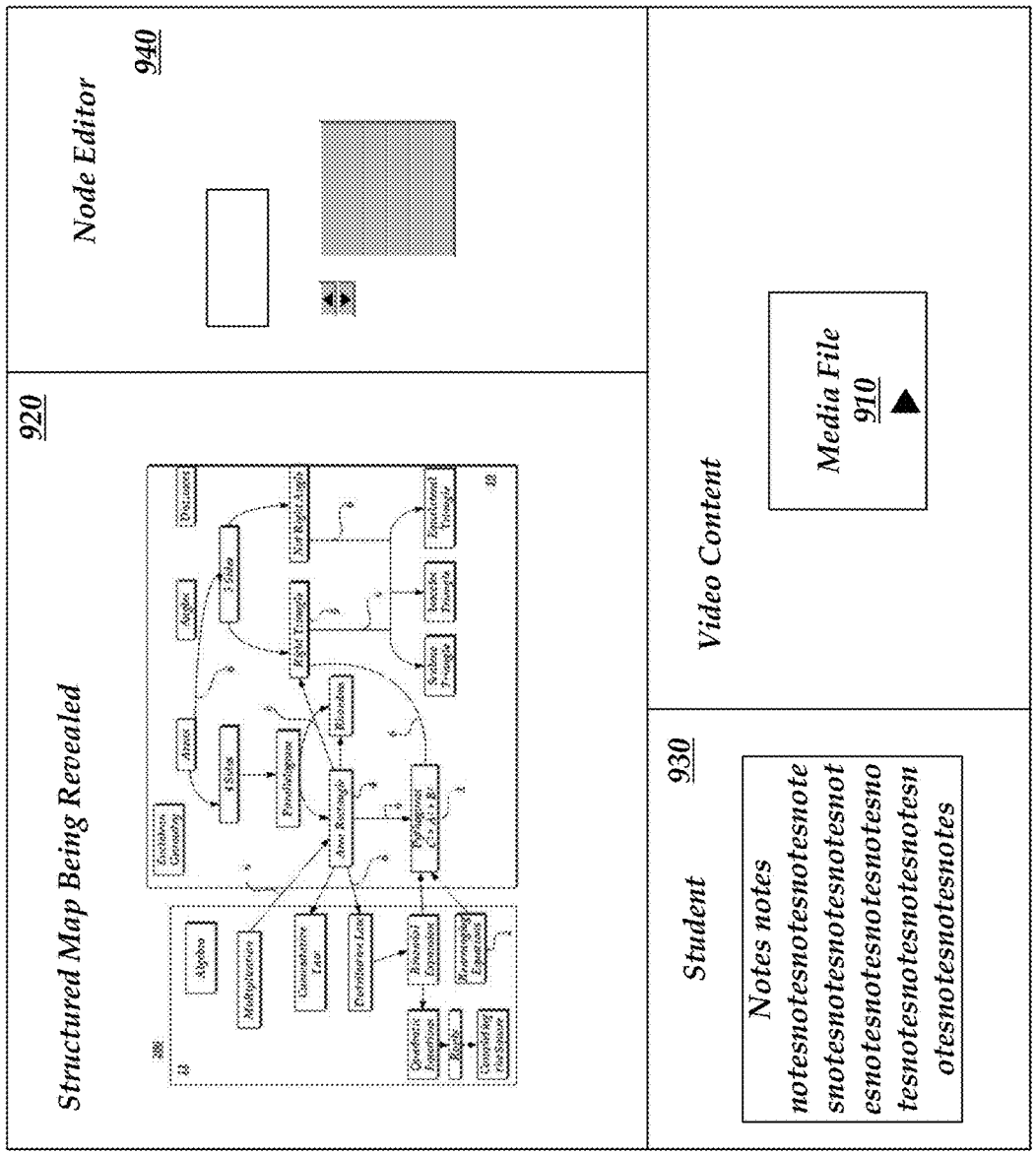
FIGS. 10, 11A, and 11B represent different visualizations and controls for user input and media display in accordance with aspects of the present application.

It should be appreciated that the positioning of the windows and/or sub windows in the graphical workplace in FIGS. 8 and 10 is not fixed and can be changed by a user at their convenience. The user may also be provided with an option to show and/or hide the windows/sub windows at their convenience. The windows and/or sub windows can also be minimized and/or maximized.

In an example implementation, the student window 930 is a window where users can create and actively engage with an interactive presentation's content. This may involve writing notes, adding annotations, or trying exercises. The student window can include additional content that is presented to a user, notes, and answer additional or supplemental content. It can time stamp inputted text, allowing it to link to a node on the knowledge landscape map or a point in the media file. This lets users review content in conjunction with the accompanying ideas from the interactive presentation.

The student window is especially useful for situations where it is inconvenient to pause a media file (e.g., in a lecture), as it allows the user to store additional information linked to a point in time. The student window can also add titles to the user's text based on which node they were viewing in the interactive presentation, or had selected, at the time.

Figure 11A:
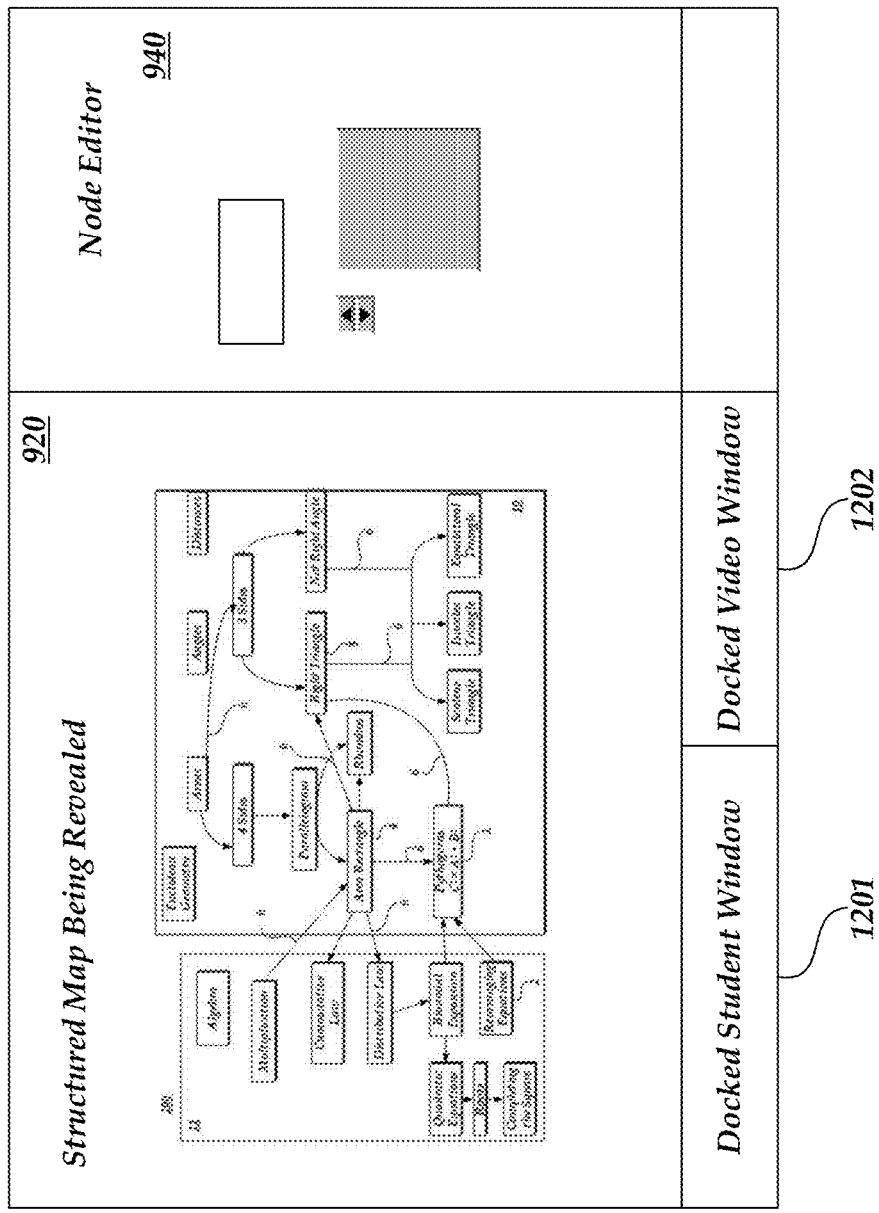
Figure 11B:
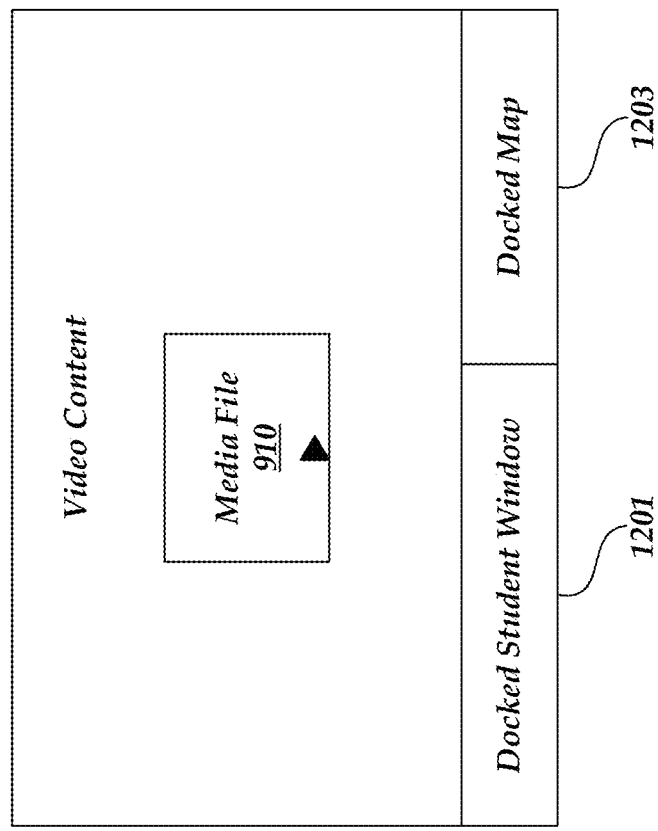
Figure 12:
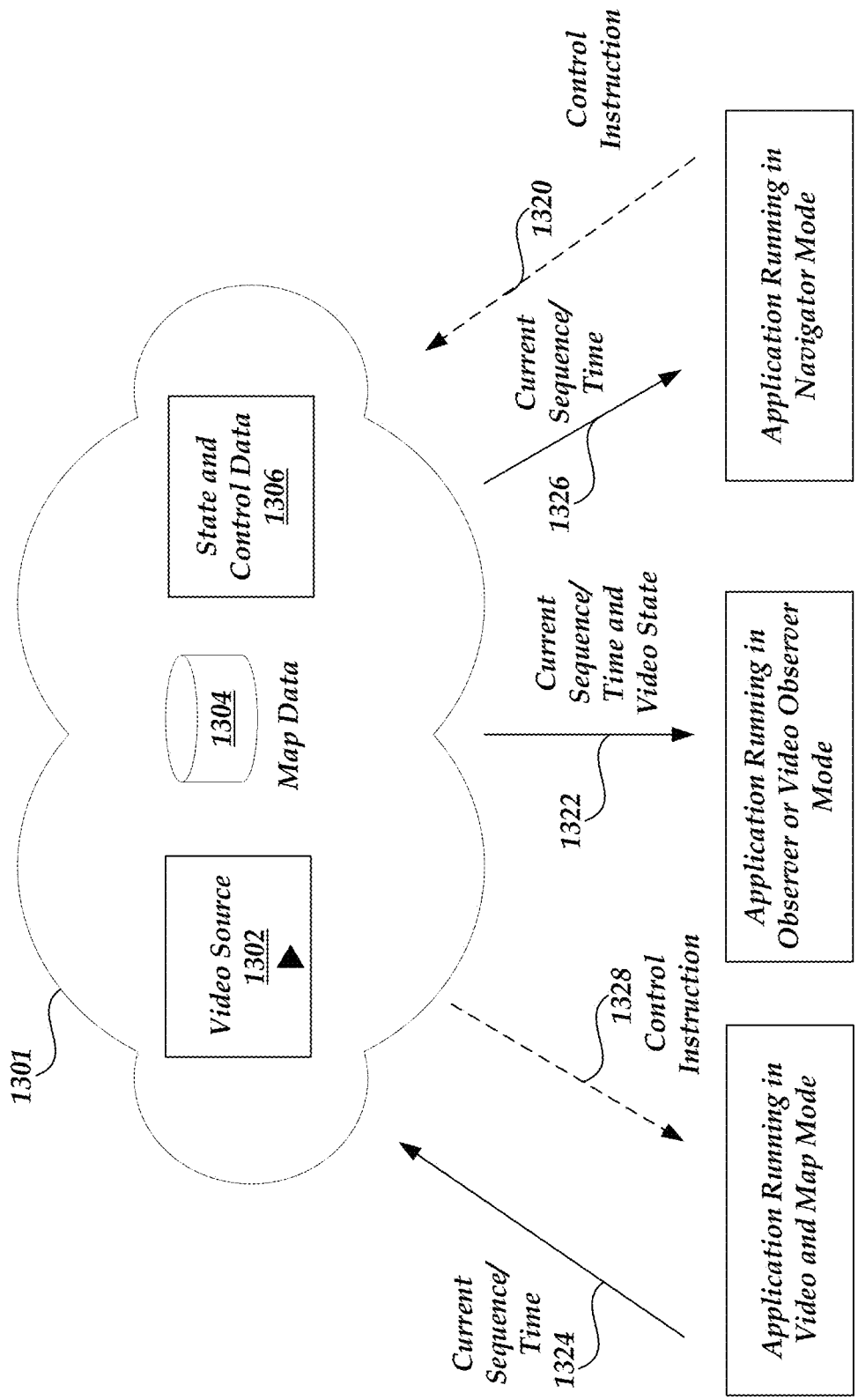
FIG. 12 depicts an illustrative interaction for the display of media in accordance with aspects of the present application.

FIG. 10 shows a representation (not actual layout or to scale) of the windows a user can see during an interactive presentation and FIG. 11A shows a representation (not actual layout or to scale) of some of the ways a user could restrict their focus to some, but not all, of the available windows. In the example of FIG. 12 embodiment, on the left hand side the instances where a viewer can limit their view to the docked windows including the docked student window 1201 and docked video window 1202 is illustrated. A note editor is also visible for the user to make notes or edit content available. Similarly, on the right hand side is the docked student window and a docked map 1203. The visual display unit in which the knowledge landscape map and related windows in FIG. 11B may be a different physical unit to that on which the media/video file and related windows are being displayed.

The 'content repository' in the student or teacher instance/window allows active learning to take place. Users are not just enabled to passively consume content. Users can access highly specific content on a topic, but also the broad connections governing the topic's knowledge landscape. Instead of being forced to 'multitask' (i.e. rapidly switch attention between these levels of granularity, which wastes cognitive resources by requiring both concepts to be held in working memory), users can switch between the levels themselves. This gives users the ability transition between 1D states (a linear progression of information), and higher dimensional states (connections between multiple units and linear progressions of information). The system stores information that would otherwise be taking up RAM while still remaining accessible.

As knowledge evolves, the learning tool/knowledge landscape maps can be easily updated to reflect this. For example, new studies can be adapted into presentations without rendering previous work on the topic obsolete. In much the same way as the control module of an orchestra harmonizes instruments to create an integrated melody, the model involves a 'control module' or a 'controller' that interfaces between four separate but related windows and actions within these windows.

The windows of this interface allow information to be conveyed in a multimodal fashion while still being temporally aligned.

A schematic outline of an interactive knowledge-driven data processing system 600 (FIG. 6) depicted in FIG. 12. In this example, the interactive data processing system 600 (FIG. 6) is shown operating in different modes on multiple devices, to provide a multi-device synchronized presentation. The Cloud 1301 (of which the gateway 146 described in FIG. 5 may form a part), or another suitable network, provides access to the one or more sources of media data 1302 and the knowledge landscape data 1304, as well as providing the communication channel 1306 for the time and control communication between the various devices using the system.

On one device 1310 an application which includes the instruction set for the control module and the control metadata instruction set is running with the graphical output comprising the graphical workspace having both the knowledge landscape map window and the media window on the same device.

The same application is running on device 1312 but in a different mode—an observer mode in which the graphical output on that device shows the map only. In this situation the user may watch the video on a separate device, for example device 1310. Thus the graphical workspace is distributed. In this example the observer can only observe the presentation which is being run or manipulated by another user, for example the user of device 1310 or 1314.

The same application is running on device 1314 but in another different mode—a navigator mode in which the graphical output on that device shows the map only, but the map may be manipulated by the user to control the presentation. In this situation the user may watch the video on a separate device, for example device 1310.

Further modes can include a video mode which is identical to the video and map mode described above, except that the user's device shows only the video content of the presentation. Another mode can include a video observer mode in which a user will follow the full presentation in either a video and map mode, or in a video mode (as described immediately above).

The control metadata relating to the current action sequence ID, elapsed controller time, or other selected parameter is communicated from device 1310 to the other synchronized devices as shown by arrows 1324, 1322 and 1326. The device 1314, which may be used to control the presentation, communicates user control instructions (for example selecting a node of the knowledge landscape map, or selecting a part of a video) to device 1310, as shown by arrows 1320 and 1328. In one example, the multi device synchronized presentation of FIG. 13 may be used in a classroom or lecture theatre with device 1310 comprising a projector or large screen, a teacher using device 1314, and students using devices 1312 so that they may take notes. In another example device 1314 comprises a television, there are multiple televisions at different geographic locations. Each student can view the television and also see the knowledge landscape map (and if desired the video also) on their device 1312.

Figure 13:
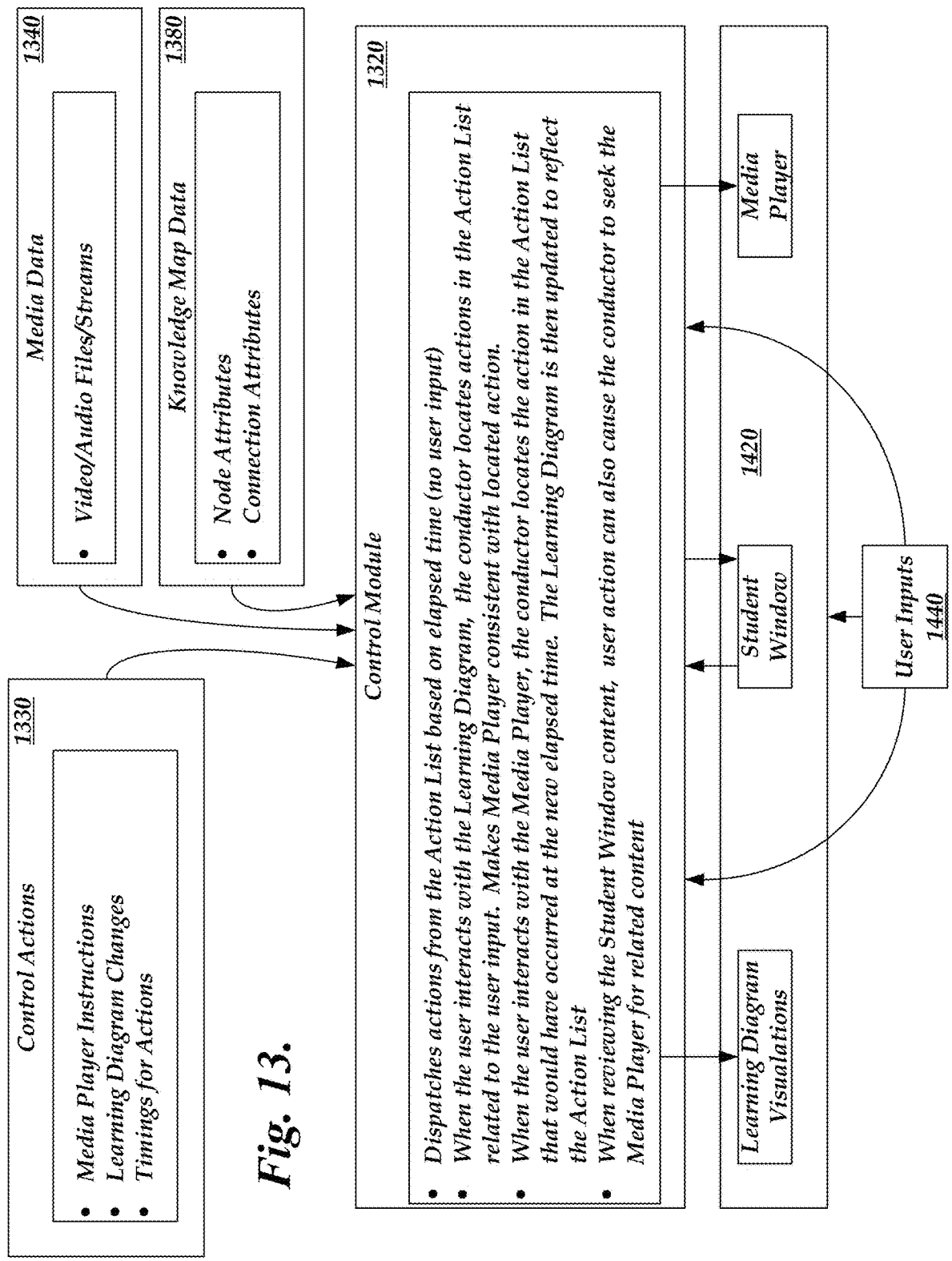
FIG. 13 depicts an illustrative interaction for the display of media in accordance with aspects of the present application.

Another variation on the example or embodiment of FIG. 13 is using the device 1310 in observer mode to present only the media file to the user. In this example, the video could be a third-party media service which is controlled by a student or teach with a separate device (e.g., a tablet 1314) running the application in navigator mode.

In one embodiment, with reference to FIG. 3, a viewer could be watching a streaming TV show comprising the media file 310, streamed to a large TV display mounted on the viewer's wall. Simultaneously, a related n-dimensional knowledge landscape map 300 is updated or manipulated on the viewer's mobile phone, tablet, laptop, VR, AR or PC, etc. The control module 350 controls and populate both sets of hardware devices in real time via the internet seamlessly The viewer could passively watch the show streamed on the TV or could at any stage optionally explore any topic currently being displayed on the large TV by interacting with the n-dimensional knowledge landscape map 300 which is synchronized by the control module 350 with the media file 310. Further detailed information would be contained in the n-dimensional knowledge landscape map 300 as well as the much more valuable knowledge as to how the current topic is related to other topics/knowledge not contained in the current presentation, which the viewer may wish to explore.

The viewer's interactions with the n-dimensional knowledge landscape map 300 on their device constitute user inputs 360 to the control module 250 which inputs are processed by the control module 350 to update or manipulate the content displayed on the large TV screen as streamed by streaming provider. Alternatively, the control module could request additional or alternate media files to be displayed on the TV screen.

Each viewer can tailor their own viewing experience to their unique needs simultaneously. For example, a viewer A could be watching and exploring the same streaming media at the same time as another viewer B, but both viewers A and B will have completely unique and tailored experiences FIG. 13 shows the overall process flow that occurs in the system. Tasks performed by the control module 1320 are detailed. FIG. 13 additionally shows the user inputs 1440. These will typically comprise a user navigating through a knowledge landscape map or video, but may also be for editing purposes, and for creating knowledge landscape maps, identifying relevant frame sequences and putting these together to create presentations.

Figure 14:
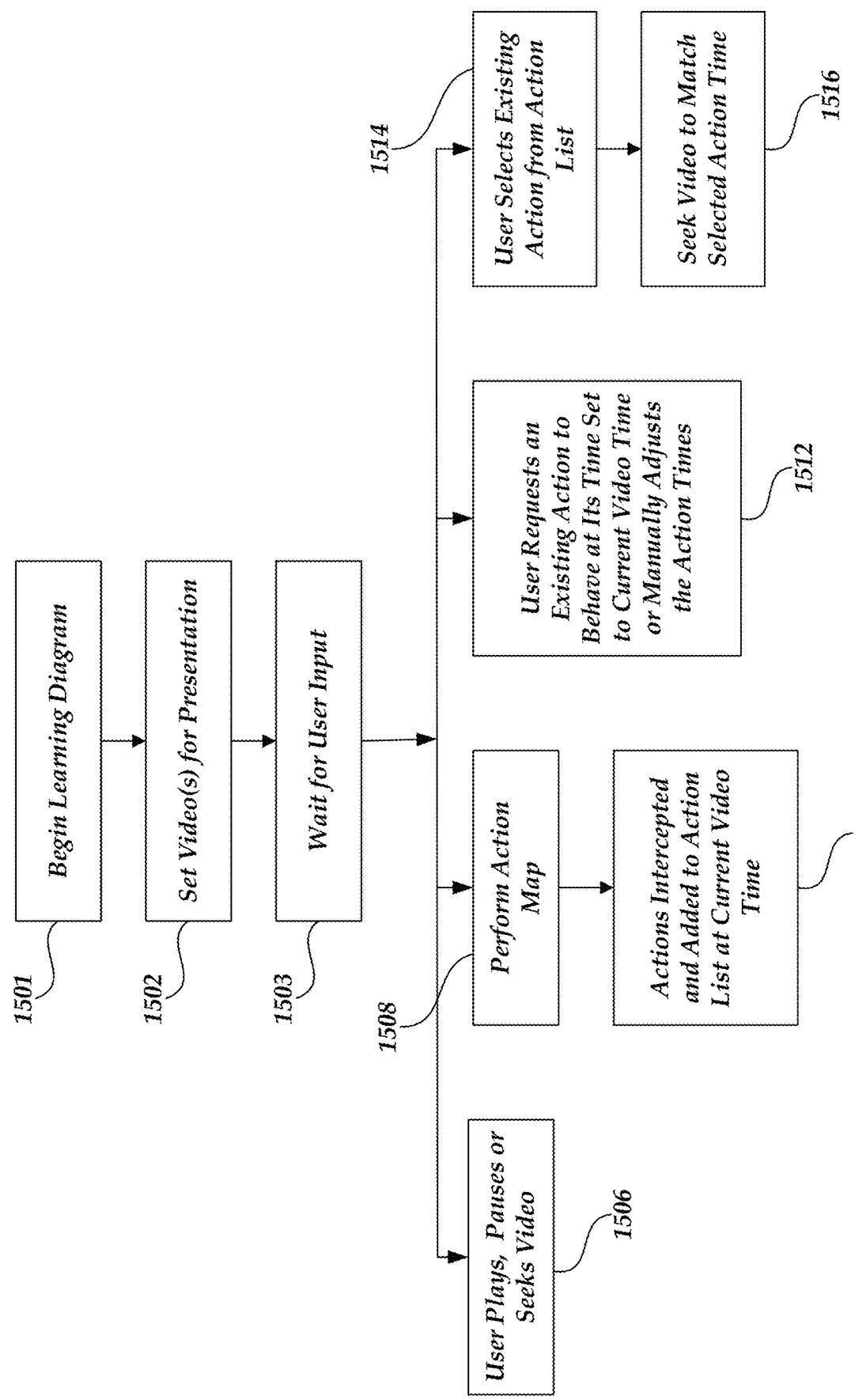
FIG. 14 is a flow diagram depicting an illustrative user input processing routine in accordance with the present application.

FIG. 14 shows an algorithmic overview of the process of creating a presentation. The process begins at step 1501 with a user such as a teacher or instructor building a knowledge landscape map. One or more video and/or audio files are selected in step 1502. As mentioned earlier in this document, these files may consist of resources already publicly available on the Internet. The system awaits user input at step 1504. Typically, the user will begin by playing the video or other media file 1506 to reach a point which is related to a knowledge topic in the landscape map. The video is then paused and the user performs actions on the map at step 1508. The actions and the relevant time intervals (or other data selected by the system) are added to the control metadata to provide the mapping or linking information described above.

The user may also wish to edit the presentation by having an existing action's time set to the current video frame or time, or manually adjust the time at which an action occurs. This is performed in step 1512. This results in the system updating the control metadata.

Another option available to the user is to select an action form the action list (step 1514), then seek a relevant part of the video related to that action at 1516, from which the control metadata is generated.

One simple example is where a media file changes how an n-dimensional knowledge landscape map is displayed. For example, it could highlight a node, hide or expose nodes, focus, pan across or zoom in and out of the n-dimensional Knowledge landscape map, open dialog boxes or find material relating to the media file in the n-dimensional knowledge landscape map.

In another example, the student could explore the n-dimensional knowledge landscape map and select a node in the n-dimensional knowledge landscape and the control module would then find the appropriate frames from the media file to help the student understand that specific topic. Additionally, as a result of the student selecting a node, the control module could temporarily halt the media file and play an alternative media file or section of an alternative media file corresponding to that node.

In a more complex e-Learning example the n-dimensional knowledge landscape map contains internal algorithms and functions, the control module can call and execute the n-dimensional knowledge landscape map's internal algorithms to produce a novel presentation or arrangement of the n-dimensional knowledge landscape map.

One example is a Geometry lesson, where the control module could send an instruction to a suitably enhanced and enabled n-dimensional knowledge landscape map to find and display only the mathematical nodes that are required to derive a particular Theorem such as Pythagoras. This action automatically rearranges the map in such a way that the mathematical derivation becomes clear for the student/viewer. The information required to perform this action may not have been explicitly encoded in the n-dimensional Knowledge landscape but was implicit in the 'functional connections' joining discrete items of mathematical knowledge As mentioned above, in many embodiments, a student would have the option and be able to record notes, perform student exercises and add to the n-dimensional knowledge landscape map as they watched the presentation. In this way, the n-dimensional knowledge landscape map could be updated and modified in real time by the student as they watched the presentation so it became a repository of new information learnt by the student. As well as modifying and adding to the n-dimensional knowledge landscape map, this also provides a method of organizing and cross-referencing new information which is learned as the presentation is being executed.

Any additions or updates made by the student could optionally be permanently recorded in the n-dimensional knowledge landscape map which the student could then explore at a later stage, either with the presentation produced by the teacher, or without the presentation and simply with the n-dimensional knowledge landscape map on its own.

For example, this can be enabled such that a viewer watches a video which may have been made by another person, available in a course or on the internet.

The viewer may construct their own structured knowledge landscape map which captures the key aspects of the video In some cases, the viewer's knowledge landscape map when incorporated into a presentation may have a number of characteristics such as will the media file leave out or skip sections of the media file, will the media file navigate in a linear manner or in a different order, or will the media file include additional information not already contained in the media file.

As there is a wealth of pre-existing instructional videos, according to another aspect, the present application provides a method or system to control a multiple existing media files such as videos, as can been seen in FIG. 7. As real-world knowledge landscapes change, the knowledge landscape map can be easily updated to reflect this. For example, new studies can be adapted into presentations without rendering previous work on the topic obsolete.

Figure 16:
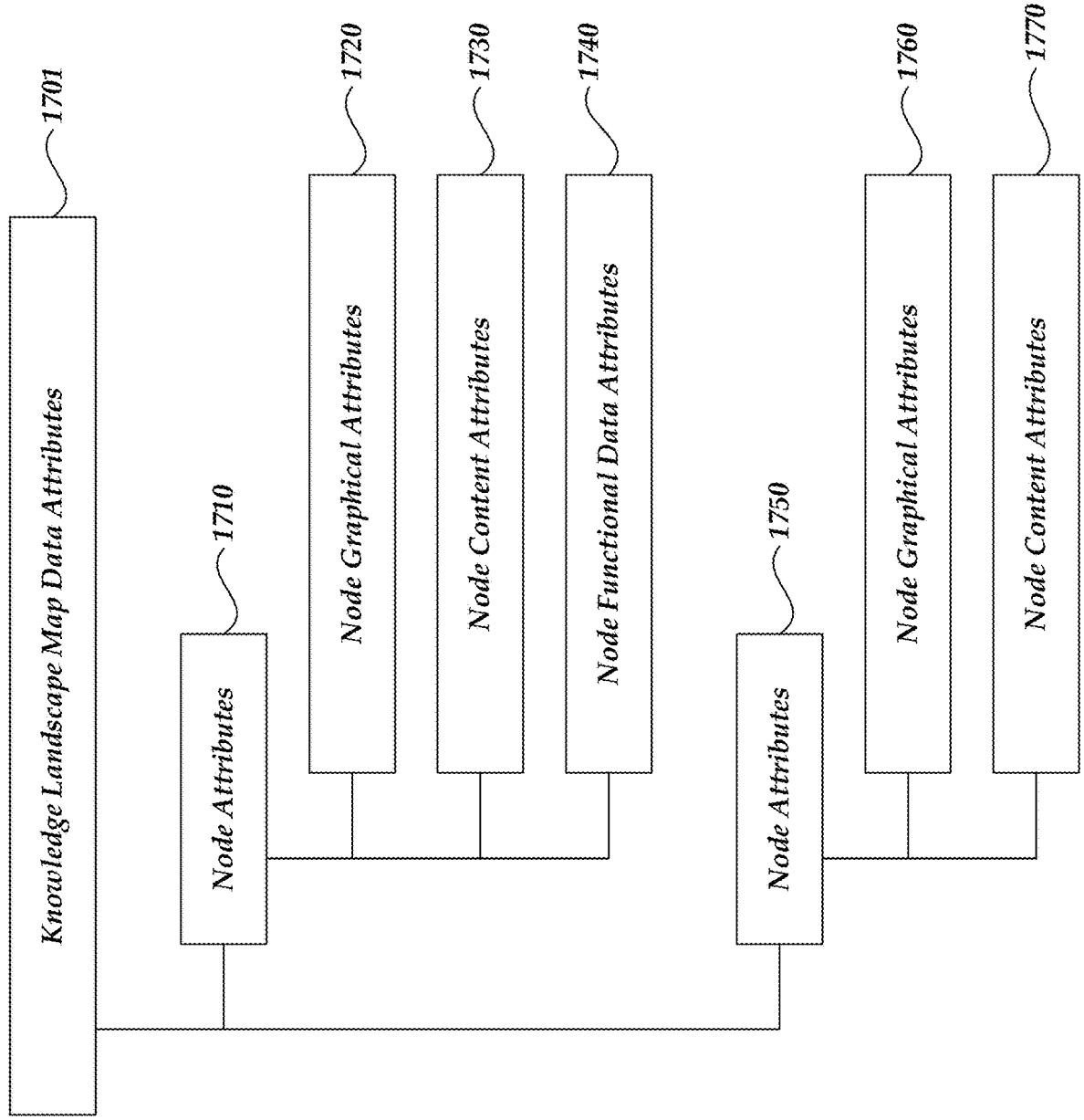
FIG. 16 is a block diagram depicting illustrative knowledge landscape map attributes in accordance with aspects of the present application.

An interactive presentation generated using the present application can be controlled via one of four key methods used to enable the one direction to n-direction bidirectional mapping and control of media files. The interactive presentation generated using the present application may have a default Method but the user can override this prior to initiating the interactive presentation and/or change between the methods during the interactive presentation. The basic steps involved in each of the four methods are depicted in FIG. 16. These are not the only methods of implementation.

Though the description below will describe each of these in more detail, here is an introductory overview:

Method A: A media file prompts the control of the knowledge landscape map. For example, a video plays and nodes appear on the knowledge landscape map based on the video's prompting event (that is, any event which triggers an action from the control module).

Method B: The user prompts the control of both the media file and the knowledge landscape map. For example, the user arranges the action list such that a node appears at one minute in, then a video plays at two minutes in.

Method C: The user's interaction with a knowledge landscape map prompts the control of the media file. For example, the user clicks on a node and the video skips to that section.

Method D: The user prompts the control of the knowledge landscape map without a media file. For example, a knowledge landscape map moves through a series of nodes on click.

Media files can be nested; e.g., nodes of a knowledge landscape map affected by a video may themselves contain a separate video.

Sometimes this second media file will be standalone (will not manipulate the knowledge landscape map). At other times, the nested media file may itself commence an entirely new Method A and launch a new view, containing 3 new windows (video, knowledge landscape map and student window).

A summary of Method A wherein a media file controls a knowledge landscape map according to an embodiment of the present application is described below with reference to FIG. 15. It should be appreciated that although these features are presented in a numerical order, the implementation of the system does not necessarily confine to this order. As illustrated, this method uses the prompting event from a media file beginning at 1620 to control the actions taken by the learning tool/knowledge landscape map.

An algorithmic overview of how this system according to the method A functions is explained below:

An embedded script plays a media file—for example purposes, call this a video at 1621. Multiple media files can prompt actions in the same knowledge landscape map, but not concurrently. For example, a video and knowledge landscape might be used to argue one side of an argument. A second video could be made to show an opposing theory, using the same base knowledge landscape map but making different points in the video itself and prompting different actions via the video.

The media file generates a prompting event when a condition is met at 1622. For example, this could be based on the timestamp of a video, the pitch of an audio file, the depth of a Virtual Reality environment; any property of a media file can be used as a prompting event. In the example of FIG. 15, the time data from playing the media file is used by the control module to calculate the elapsed controller time (706, FIG. 7).

The prompting event is sent to the control module. The control module uses the control metadata to synchronize events prompted from either user actions or media file progress points to coordinate one or more actions in parallel affecting both the knowledge landscape map and the media file. The control module works based on the action list, (e.g., revealing and modifying the knowledge landscape map nodes) based on one or more prompting events meeting a particular criterion to update, modify or otherwise manipulate the visual representation of the knowledge landscape map as shown at 1623. Multiple items on an action list can execute at once. For example, in a very simple example a video could send timestamps as prompting events. At two minutes in, this could trigger the control module to execute "Show node 1" and "Highlight connector 11" from the action list.

The media file will only be dependent on its own controls (e.g., video pause button) and its state will not be influenced by the user interacting with the knowledge landscape map. The knowledge landscape map will have similar playback controls and if the user interacts with those controls, the system will switch to Method B.

A single video/audio file combined with a single action list can also access, call, modify or synthesize multiple knowledge landscape maps to explain a topic.

At any time, the user can pause, rewind or fast-forward the video and the other two screens will keep up.

A summary of the Method B wherein an interactive presentation controls a media file according to an embodiment 1630 of the present application is described below with reference to FIG. 16. It should be appreciated that although these features are presented in a numerical order, the implementation of the system does not necessarily confine to this order.

Figure 15:
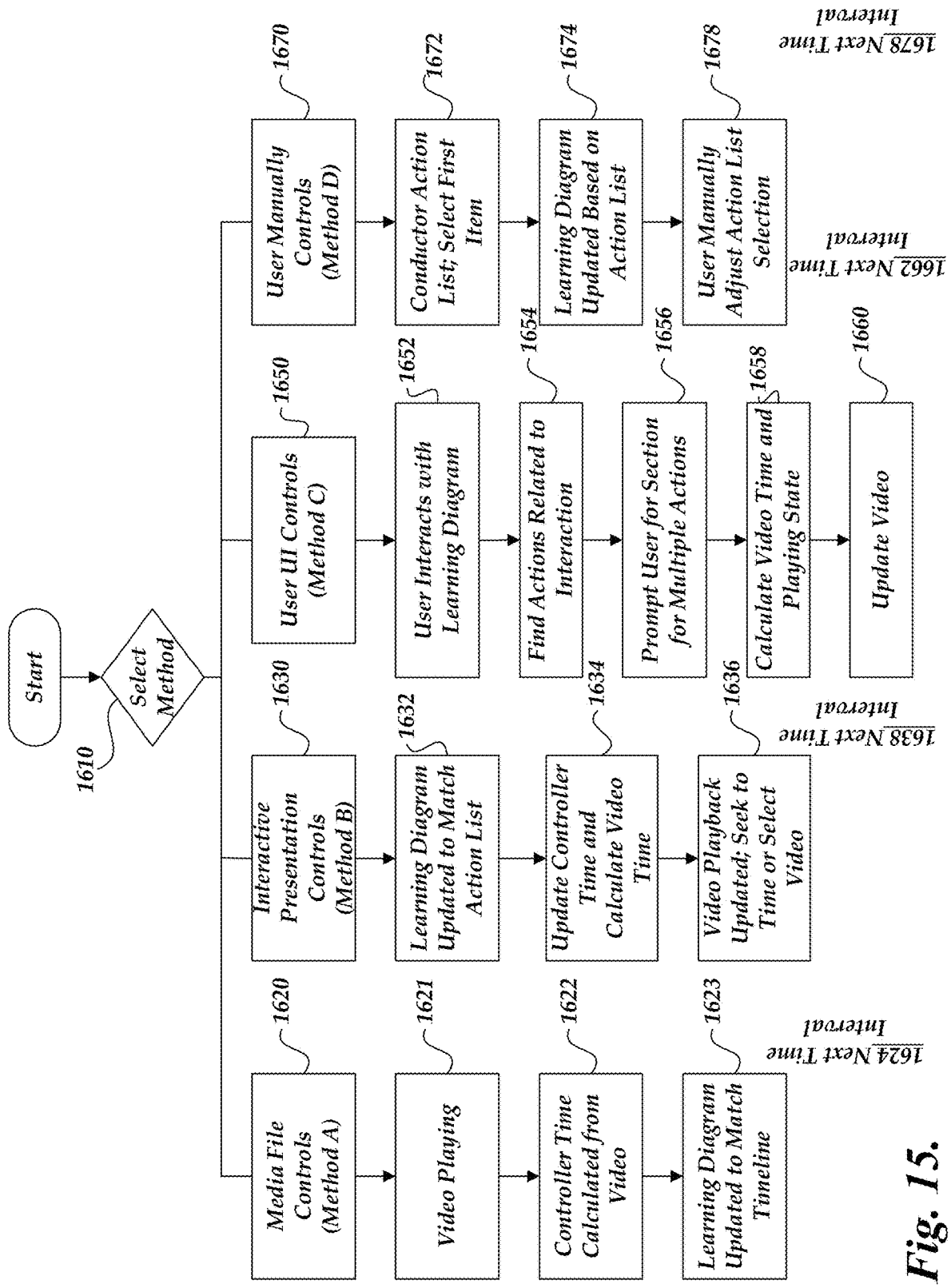
FIG. 15 is a flow diagram depicting an illustrative user input processing routine in accordance with the present application.

As illustrated in the FIG. 15, this method uses the prompting events driven by the control module's internal clock (i.e. the elapsed controller time 706 of FIG. 7) to affect both the knowledge landscape map and media file(s).

An algorithmic overview of how this system according to the Method B is depicted in FIG. 16 and is explained below:

The knowledge landscape map is updated or manipulated in step 1632 to reflect the action (714, FIG. 7) present in the control metadata based on the action sequence ID (710, FIG. 7).

The elapsed controller time is updated in step 1634 and this is used to determine the frame reference (705, FIG. 7) for the media file. Alternatively, the elapsed controller time may be used to calculate an elapsed time for the relevant video, and this time may be used to locate a reference for the media file.

The media or video playback is updated to the selected reference in step 1636.

The control module then increments to the next action sequence ID in 1638 once the controller elapsed time for the current sequence step has expired, and the next sequence step commences with a return to step 1632.

The learning tool/knowledge landscape map timeline plays and can be manipulated (e.g., paused, rewound etc.) like a video.

The knowledge landscape map can make use of multiple media files.

The use of videos can be selective (e.g., start video at 13:26, play to 18:42).

In another embodiment, the current system is configured such that a viewer watching a video which may have been made by another person, available on a course or on the internet can be able to generate a knowledge landscape map corresponding to the video. For example, the viewer can construct a 'play order' for their own knowledge landscape map/structured Map. This structured knowledge landscape map play order will reveal, populate and manipulate the viewer's structured map. Simultaneously, this structured map play order will find only those sections of the video relating to the nodes and connectors specified by the viewer and in the order they are revealed. This allows the viewer to produce a custom experience for an existing video which they may not own or have downloaded. The system can also be extended to multiple videos where a viewer can link and control sections from multiple 3rd party videos to produce the appearance of a single video controlled and revealed according to their taste. Additionally, the viewer can add or embed additional content inside their structured map to supplement the 3rd party videos that have been linked to the knowledge landscape map.

Still further, an online marketplace will allow users to share and/or sell access to their own structured knowledge landscape maps and/or interactive presentations. This will increase consumption of structured maps in general and lead to an improvement of the quality of the structured maps, as the creator may be incentivized by factors such as one or more of the desire to promote their views and/or get recognition for their efforts, creativity, insight or intellect, monetary income, or desire to educate others.

The playback procedure of this embodiment is illustratively embodied as a structured map playback is initiated by the user. At the elapsed time specified on each action, the action is performed. This includes actions to select and play video or audio. Additionally, video/audio will continue to play until there is no more video/audio to play, an action is reached that pauses the video/audio, or an action is reached that switches to a different video/audio.

Still further, the user can pause the presentation. Pausing this will pause both the structured map control module action sequence and any video/audio that is currently playing. The user can seek by selecting an attribute in the map. Seeking will cause the video/audio to seek/select/pause so that it will be in the same state as it would have been if the presentation had played to the seek location. The user can interact with the revealed knowledge landscape map at any time. Their interaction with the map has no influence on the playback state of either the map or the video.

The video controls will also be visible and if the user interacts with these, the system will switch to mode A.

Generating learning tool timeline from a controlled video—Method B.

The procedure to create mode B is similar to that used to create Method A. Create an ordered list of actions that reveal and modify the knowledge landscape map nodes, connections and content. The actions are a superset of those used in Method A. The following additional actions are supported in Method B: including selecting a video/audio track to play, seek to an elapsed time in the video or audio, play the video/audio from the current seek time, or pause the video/audio A summary of Method C, wherein a user controls media file via the learning tool/knowledge landscape map according to an embodiment of the present application are described below beginning at 1650 in FIG. 16. It should be appreciated that although these features are presented in a numerical order, the implementation of the system does not necessarily confine to this order.

The conceptual overview of method C is described below.

Method C takes the user actions in navigating the knowledge landscape map and these send prompting events.

The prompting event influences the media file via the control module.

For example, the user may click on a node then be redirected to a later segment of a video.

This method allows users to be shown an overview of the content on offer and then chart their own path through this content.

Functions

The knowledge landscape map timeline plays and can be manipulated (e.g., paused, rewound etc.) like a video.

The knowledge landscape map can make use of multiple media files.

The use of videos can be selective (e.g., start video at 13:26, play to 18:42).

Mapping user actions to presentation timeline

User navigation of a structured knowledge landscape map is primarily done by selecting nodes, selecting connections or connectors, selecting content, scrolling a map area, zooming a map area, zooming the map and the like. These actions may directly appear in the structured map timeline or they may be mapped to similar actions found in the timeline.

Since a presentation timeline can also include actions that change the knowledge landscape map, if the user manually performs one of these actions, it can also trigger a video seek.

The mapping is described in Table 10 below. Although it is to be noted that, control module action(s) that directly match a single timeline action are omitted from the table below.

TABLE 10

Mapping process

| User Action | Control module Action(s) |
| --- | --- |
| Select node | Select or Reveal node |
| Select connection | Select connection or reveal the connection's destination node |

If more than one of these actions is found, the one that maps to the video at the closest time to the current video play time is used.

If the user navigation would cause the video to skip forward less than a configurable number of seconds (for example default 5 seconds), the video will continue to play rather than actually skipping. This will allow users to manually navigate the structured Map without missing small sections of the video.

Referring again to FIG. 16, in this example, a user interacts with the knowledge landscape map (for e.g., by clicking on a node in the knowledge landscape map) in step 1652. The control module then uses the control metadata to locate the action or actions that relate to the selected map attribute (as per 712 and 714, FIG. 7) in step 1654. If multiple actions are found, then the system can make a selection of the appropriate action based on the context of the map or video. This may be done for example by looking at the elapsed controller time, or elapsed video time or knowledge landscape map state (for example nearest snapshot ID). Alternatively, as indicated in step 1656, if the correct action is not apparent then the user may be prompted to make a selection. Once the action has been identified, by the system or user, then elapsed controller time is used in step 1658 to determine the frame reference (705, FIG. 7) for the media file. Alternatively, the elapsed controller time may be used to calculate an elapsed time for the relevant video, and this time may be used to locate a reference and playing state for the media file.

The media or video playback is updated to the selected reference in step 1660, and the process returns to step 1652 to await further user interaction with the knowledge landscape map.

A summary of Method D, wherein a user controls the learning tool/knowledge landscape map according to an embodiment of the present application, is described below with reference to FIG. 16 beginning at step 1670. It should be appreciated that although these features are presented in a numerical order, the implementation of the system does not necessarily confine to this order.

This is the most straightforward of all the methods. Method D uses the user's manual prompting event to control the actions taken by the knowledge landscape map.

The action sequence ID (710, FIG. 7) is set to 1 in step 1672. In step 1674 the knowledge landscape map is updated or manipulated by the control module using the control metadata as per FIG. 7 based on the sequence ID. The user performs an action (such as clicks) on a representation of the action list, as shown in step 1676 to move to another sequence ID. This sends a prompting event to the control module and the system returns to step 1674 to again update the knowledge landscape map.

There is no timing in Method D, merely a sequence of events prompted by the user manually driving the interactive presentation forward or backwards.

The implementation of the invention allows for a user to switch between the methods A-D rather than being restricted to one of them. In some embodiments a particular video might only use a small subset of an existing Structured Map to instruct a student on a particular topic—for example, in FIGS. 1 and 2, we see that the derivation of the Theorem of Pythagoras only requires a small subset of the wider mathematical landscape. Because of this, a single knowledge landscape map can be reused multiple times by different videos to help the student understand different topics contained within a structured map. For example, one video could explain the Theorem of Pythagoras and another video, could use the same structured map to derive the formula for the area of Pyramids, Circles, Frustums etc. Additionally, multiple mappings are an extremely useful feature for both students and teachers:

A teacher can re-use the same Structured Map for many different lessons without having to reinvent the map or make one specifically for that lesson. Irrelevant nodes or connectors will automatically be hidden and only those nodes and connectors necessary for the lesson will be visible.

Because a single Structured Map is reused for multiple lessons, a student will quickly understand how each lesson is related to other lessons and how information and knowledge is connected. This is a vital aspect of learning as noted in the description earlier.

The converse of the linking multiple videos is also an extremely useful feature whereby a single video or Audio combined with a single structured control module action sequence accesses, calls, modifies or synthesizes multiple knowledge landscape maps to explain a topic.

Linking, accessing or manipulating multiple structured Maps inside a single course is extremely useful in modern teaching courses where there is an emphasis of 'cross curricula teaching'.

Illustratively, a video may set out to explain the 'Acceleration of a Vehicle'. To do this, the video may be associated with topics such as physics (kinematics equations, Newton's laws of motion, etc.), chemistry (combustion), fluid dynamics (aerodynamic drag), and mathematics (calculus of gradients and areas under the curve). Each of the topics may be embedded in their own separate but substantial structured map. For example, in explaining the chemistry of combustion, there might be topics such as electron orbital shells, the Periodic Table, Atomic Weights and so on. While a full understanding of the entire chemistry structured map may not be necessary to understand the motion of a car, linking multiple maps provides a number of extremely valuable advantages for both the student and teacher. For example, a student can see how various disciplines interact and form a wider body of scientific knowledge. Information is not "siloed" strictly according to academic disciplines. Additionally, the student can spontaneously explore surrounding 'extension content' that is not covered in the course. Self-driven learning and exploration is a highly valued goal of modern teaching. Having multiple maps linked in this way provides a structured way for students to spontaneously learn and explore new domains.

By combining the above actions with the sum of preceding "Pause until next action" delays, the system generates a list of video segments that represent a continuous "virtual video."

When used with "Method B", the "virtual video" has gaps in it, which account for times when the video is not playing. For example, if the knowledge landscape map displays some nodes at the beginning before showing any video, the "virtual video" would display as blank screen during this time. Also, if the presentation pauses video, the virtual video would contain the paused screen for the duration of the actions in the presentation prior to a "Seek and Play" or "Play" action.

When used with "Method C", the "virtual video" has no gaps or pauses and contains only the selected video segments. This means it could be shorter than the "Method B" presentation sequence.

It is to be noted that the video is virtual in the sense that a new video isn't actually generated but rather a list of videos, seek points and play durations is built from which a continuous new video can be played. The tables 11 and 12 depict the list fields for virtual video segments and their list examples, respectively.

TABLE 11

Virtual video segment list fields

| Property | Description |
|---|---|
| Video Source URL | The universal resource locator |
| Start Time | Video elapsed time of the start of the segment |
| Segment Duration | Duration of the segment (Finish Time = Start Time + Segment Duration) |

TABLE 12

Virtual video segment list example

| Video Source URL | Start Time | Segment Duration |
|---|---|---|
| http://bit.ly/video1 | 2:04 | 0:32 |
| http://bit.ly/video2 | 5:56 | 0:49 |
| http://bit.ly/video3 | 2:41 | 0:15 |
| http://bit.ly/video4 | 0:32 | 0:51 |
| http://bit.ly/video5 | 0:45 | 0:27 |

In the present data management system, nodes of a structured Map being accessed and controlled by a video may themselves contain a separate video.

Sometimes this video will be just a standalone video that will explain some aspect of the course in more depth if required by the student like normal videos do, i.e. will not manipulate the structured Map. For example, the node labelled 'Pythagoras' may contain a video showing how the rectangle is cut up into two rectangles and 4 triangles. This is shown in FIG. 9.

At other times, the nested video may itself commence an entirely new Method A and launch a new view containing 3 new windows (video, Structured Map and Students Window).

A summary of user-controlled aspects according to an embodiment of the present application are described below. It should be appreciated that although these features are presented in a numerical order, the implementation of the system does not necessarily confine to this order. In one aspect, the user-controlled aspects can facilitate defining attributes, to the connectors between nodes. In another aspect, the user-controlled aspects can facilitate Pause and resume the interactive presentation. An interactive presentation is when one combines the knowledge landscape map, media file(s) and control module's abilities to convey information to user(s). All aspects of an interactive presentation can be paused and resumed by the user or other external input. In still another aspect, the user-controlled aspects can facilitate navigation in time. User can skip to a specific time in the media file or interactive presentation.

In still other aspects, the user-controlled aspects can facilitate selection of nodes. Users can click a particular node to read its contents. Clicking on a node in the knowledge landscape map pauses, and minimizes or 'docks', any active media files. This supports user autonomy and prevents the inefficiencies of attentional switching when forced to multitask. In yet other aspects, the user-controlled aspects can facilitate selection of a connections. Users can click a particular connector to read its type. This also pauses and minimizes/docks any active media files. In still another aspect, the user-controlled aspects can facilitate navigation of node content. Users can scroll, read through or otherwise interact with the information contained in nodes.

In still other aspects, the user-controlled aspects can facilitate editing node content (in main Editor). Users can also alter existing node content. Still other aspects, the user-controlled aspects can facilitate adding comments to the map. These are similar to nodes, but are visually distinct and are disconnected from the knowledge landscape map; they annotate sections of the knowledge landscape map itself. Yet other aspects, the user-controlled aspects can facilitate interacting of user of graphics (open, close, interact with etc.) the student window (as previously defined).

As mentioned above with reference to Tables 1-10, data structures relating to the knowledge landscape map 300 may include data attributes for the nodes (e.g., nodes 1-5 of FIG. 1) and structures for the connectors 6. A simple outline of an examples of these structures is shown in FIG. 16. Referring to that figure, the knowledge landscape map data attributes 1701 include nodes attributes 1710 and connector attributes 1750. The node data attributes 1710 have graphical attribute data 1720 which defines graphical elements of the nodes as portrayed via the interface, for example the size of a box showing the nodes and the color of that box. Nodes also have content attribute data 1730 which may for example comprise text describing the topic embodied by the node, and may include links to other relevant content. Node functional attribute data 1740 can also be provided. The outputs from processing the functional data 1740 can be used to update the graphical data displayed to a user.

Similarly, the connector attribute data 1750 may comprise connector graphical attribute data 1760 defining graphical elements of the connectors as portrayed to a user. Connector functional attribute data 1770 can also be provided which may be processed to provide outputs that may be used to update the graphical outputs and/or used as inputs for further processing.

Using Connector or Node Functional Attribute Data to Reveal Selected Relationships in Knowledge Landscape Map In one embodiment, the connector functional attribute data 1770 can be used to flag or indicate certain relationships between nodes. These relationships may not be immediately apparent to a user, but the interface disclosed herein allows a user to selectively reveal these relationships. In one example, the relationships may be certain subsets of nodes that share a particular property. Thus in a simple example referring to FIG. 2, the knowledge landscape map 200 includes the nodes 1 to 5 that are required to derive the theorem of Pythagoras. The connector functional attribute data 1770 (or in another embodiment node attribute data 1730 or 1740) may encode this relationship. Therefore, when a user inputs an instruction to show the relationship, the control module 350 updates the graphical display to highlight or otherwise display the nodes 1-5 as they appear in FIG. 1.

The system may also provide an instructor or teacher dashboard as part of the interface. This allows an instructor to view aspects of use of the system described above In accordance with further aspects of the present application, the data processing system 600 can maintain and store state information regarding interaction with the knowledge maps. For example, each user interaction can be measured in terms of nodes that were accessed during the presentation of knowledge map. The historical information can be utilized to determine individual concepts that require or correspond to the greatest amount of time or type of interaction elicited by each individual node. The information can be further processed according to multiple users. In one example, the historical information can be utilized in the generation of review materials for concepts/topics.

Aspects of the present application may be embodied in a number of use cases or applications to industry. Such embodiments can include, but are not limited to, education online and self-taught (eLearning), structured learning system—monitoring learning processes, standardizing testing so employers and institutions can evaluate student abilities without the impact of 'grade inflation' and collaboration, platform for students (and teachers). Such embodiments can include Cognitive Behavioral Therapy (CBT), edutainment, military, strategic analysis—both theoretical and real time based on live inputs, action, healthcare, diagnostics, medical aftercare, aerospace, spots, social media, finance/board governance, machine interfaces, logistics, data mining, compliance, marketing, research, and the like.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing interaction content, the system comprising:
   a first data store implemented on a first computing device, the first data store for maintaining media segments made up of set of frames of data and forming a set of media data;
   a second data store implemented on a second computing device, the second data store for maintaining knowledge landscape map information, wherein the knowledge landscape map information defines individual learning topics organized according to a set of nodes and set of connectors, wherein individual nodes of the set of nodes represent identifiable concepts associated with a specified topic and wherein individual connectors between two nodes of the set of nodes represent at least one of a relationship, function or dependency between two respective concepts associated with specified topic and assigned to the two nodes of the set of nodes;

a third data store implemented on a third computing device for maintaining control metadata for the knowledge landscape map information and the media segments, wherein the control metadata identifies for individual nodes of the set of nodes controller media metadata correlating one or more individual frames of selected media segments to display based on selection of one or more of the individual nodes, and action sequence metadata defining a set of attributes for the presentation of the one or more of the individual nodes and the correlated individual frames of the set of frames associated with the selected segments;

a controller, implemented on a computing device having a memory and a processor, wherein the computing device executes computer-readable instructions that cause the controller to:

obtain user interaction information related to a display of at least a portion of the knowledge landscape map information;

characterize the user interaction as pertaining to an identified node of the set of nodes;

identify control metadata from the third database relating to the identified node, the control metadata including controller media metadata identifying one more media segments and correlating individual frames of the set of frames associated with the identified one or more media segments and action sequence metadata defining display attributes of the identified node and the identified correlated individual frames of the set of frames; and cause a presentation of the identified one or more media segments correlated to associated node based on a first portion of the action sequence metadata of the identified action sequence metadata in the control metadata and modify the display of the identified node of the knowledge landscape map information based on a second portion of the action sequence metadata of the identified action sequence metadata in the control metadata.

2. The system as recited in claim 1, wherein the action sequence metadata identifies a visual property of one or more nodes of the set of nodes based on presentation of a correlated media segment.

3. The system as recited in claim 2, wherein the visual property of the one or more nodes includes at least one of causing the node to be visible in the display of the at least a portion of the knowledge landscape map information or causing the node to not be visible in the display of the at least a portion of the knowledge landscape map information.

4. The system as recited in claim 1, wherein an attribute of the set of attributes corresponding to the action sequence metadata specifies an elapsed time to present a correlated media segment.

5. The system as recited in claim 1, wherein the media data corresponds to a plurality of media segments and wherein the controller metadata correlates individual media segments of the plurality of media segments.

6. A method for managing the display of media segments in an interactive environment, the method comprising:

obtaining user interaction information related to a display of at least a portion of knowledge landscape map information, wherein the knowledge landscape map information defines individual learning topics organized according to a set of nodes and set of connectors, wherein individual nodes of the set of nodes represent identifiable concepts associated with a specified topic and wherein individual connectors between two nodes of the set of nodes represent information corresponding to attributes between two respective concepts associated with specified topic and assigned to the two nodes of the set of nodes;

characterizing the user interaction information to identify control metadata, the control metadata attributable to at least one node in the knowledge landscape map information and one or more media segments, wherein the control metadata includes controller media metadata identifying individual frames of a set of frames associated with the attributed one or more media segments to be presented based on user interaction and action sequence metadata defining display attributes of the attributed one node and the identified correlated individual frames of the set of frames; and causing a presentation of the one or more individual frames of the set of frames associated with the attributed one or more media segments attributable to the identified control metadata based on the identified action sequence metadata and modifying the display of the attributed one node in the knowledge landscape map information based on the identified action sequence metadata in the control metadata.

7. The method as recited in claim 6, wherein the control metadata includes controller media metadata correlating one or more media segments to individual nodes of the set of nodes.

8. The method as recited in claim 7, wherein the control metadata includes action sequence metadata defining a set of attributes for the presentation of the correlated one or more media segments to the individual nodes of the set of nodes.

9. The method as recited in claim 8, wherein an attribute of the set of attributes corresponding to the action sequence metadata identifies a visual property defined for the at least a portion of the knowledge landscape map.

10. The method as recited in claim 8, wherein an attribute of the set of attributes corresponding to the action sequence metadata specifies an elapsed time to present a correlated media segment.

11. The method as recited in claim 7, wherein the control metadata includes snapshot metadata defining a plurality of graphical representations of the knowledge landscape map information for the correlated one or media segments to the individual nodes of the set of nodes.

12. The method as recited in claim 6, wherein causing a presentation of the one or more media segments correlated to associated node based on the identified control metadata and modifying the display of the at least a portion knowledge landscape map information based on the identified control metadata includes causing a presentation of the one or more media segments on a first output device and modifying the display of the at least a portion of the knowledge map information on a second output device.

13. The method as recited in claim 6, wherein characterizing the user interaction information to identify control metadata includes characterizing the user interaction to correspond to at least one of a node or connector in the knowledge landscape map information.

14. The method as recited in claim 6, wherein characterizing the user interaction information to identify control metadata includes obtaining user input via an interface generating during the presentation of the one or more media segments, the user input corresponding to at least one of annotations, notes or access to an external data source.

15. A method for managing the display of media segments in an interactive environment, the method comprising:
  associating user interaction information related to a display of at least one node in a portion of knowledge landscape map information, wherein the knowledge landscape map information is organized according to individual nodes of the knowledge landscape map information assigned to individual identifiable concepts associated with a specified topic and connectors between two nodes assigned to attributes between the identifiable concepts;
  processing control metadata attributed to media data to be generated based on the user interaction, wherein the control metadata includes controller media metadata defining a presentation order for individual frames of a set of frames forming the one or more media segment to facilitate presentation of the one or more media segments independent of a sequence of selection of identifiable concepts and action sequence metadata defining display attributes of the identified node and the identified correlated individual frames of the set of frames; and
  causing a presentation of the individual frames of a set of frames forming the one or more media segments based on a first portion of the action sequence metadata of the identified action sequence metadata in the control metadata and modify the display of the identified node of the knowledge landscape map information based on a second portion of the action sequence metadata of the identified action sequence metadata in the control metadata.

16. The method as recited in claim 15 further modifying the display of the at least a portion knowledge landscape map information based on the processed control metadata.

17. The method as recited in claim 15, wherein the control metadata defines at least one of a visual property of the at least a portion of the knowledge landscape map information or an elapsed time to present the one or more media segments.

18. The method as recited in claim 15, wherein the user interaction information includes at least one of interaction with at least one identifiable concept, at least one media segment of the media data or at least one additional interface.

19. The method as recited in claim 15 further comprising recording the presentation of the one or more media segments based on the processed control metadata.

20. The method as recited in claim 15, wherein the knowledge landscape map information defines individual learning topics organized according to a set of visual nodes and set of visual connectors, wherein individual nodes of the set of nodes represent the identifiable concepts associated with a specified topic and wherein individual connectors define at least one of a relationship, function or dependency between two nodes.

* * * * *